(12) United States Patent
Han et al.

(10) Patent No.: US 11,991,392 B2
(45) Date of Patent: May 21, 2024

(54) EFFICIENT CONTEXT MODEL COMPUTATION DESIGN IN TRANSFORM COEFFICIENT CODING

(71) Applicant: GOOGLE LLC, Mountain View, CA (US)

(72) Inventors: Jingning Han, Santa Clara, CA (US); James Zern, San Francisco, CA (US); Linfeng Zhang, Palo Alto, CA (US); Ching-Han Chiang, San Jose, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/866,707

(22) Filed: Jul. 18, 2022

(65) Prior Publication Data
US 2022/0377376 A1    Nov. 24, 2022

Related U.S. Application Data

(63) Continuation of application No. 17/106,898, filed on Nov. 30, 2020, now Pat. No. 11,405,646, which is a continuation of application No. 16/693,438, filed on Nov. 25, 2019, now Pat. No. 10,869,060, which is a continuation-in-part of application No. 15/883,323, filed on Jan. 30, 2018, now Pat. No. 10,506,242.

(51) Int. Cl.
| | |
|---|---|
| *H04N 19/129* | (2014.01) |
| *H04N 19/13* | (2014.01) |
| *H04N 19/184* | (2014.01) |
| *H04N 19/60* | (2014.01) |
| *H04N 19/88* | (2014.01) |

(52) U.S. Cl.
CPC .......... *H04N 19/60* (2014.11); *H04N 19/129* (2014.11); *H04N 19/13* (2014.11); *H04N 19/184* (2014.11); *H04N 19/88* (2014.11)

(58) Field of Classification Search
CPC .............................. H04N 19/60; H04N 19/129
See application file for complete search history.

(56) References Cited

U.S. PATENT DOCUMENTS

| | | | |
|---|---|---|---|
| 7,054,493 B2 * | 5/2006 | Schwartz | H04N 19/176 375/E7.064 |
| 7,941,433 B2 * | 5/2011 | Benson | G06F 16/283 707/748 |

(Continued)

OTHER PUBLICATIONS

Bankoski et al., "VP8 Data Format and Decoding Guide", Independent Submission RFC 6389, Nov. 2011, 305 pp.

(Continued)

*Primary Examiner* — Irfan Habib
(74) *Attorney, Agent, or Firm* — Young Basile Hanlon & MacFarlane, P.C.

(57) ABSTRACT

A transform type is obtained for decoding the transform block of transform coefficients. A template for entropy-decoding values related to the transform coefficients is selected based on the transform type. The template indicates, for a to-be-coded value, positions of already coded values. A context for selecting a probability distribution for entropy decoding a current value of the values is determined using the template. The current value is entropy decoded from a compressed bitstream using the probability distribution.

20 Claims, 17 Drawing Sheets

(56) References Cited

U.S. PATENT DOCUMENTS

| | | | | |
|---|---|---|---|---|
| 8,692,695 B2* | 4/2014 | Fallon | G06Q 40/04 | 341/51 |
| 8,742,958 B2* | 6/2014 | Fallon | G06T 9/005 | 341/51 |
| 9,106,913 B2* | 8/2015 | Sole Rojals | H04N 19/18 | |
| 9,264,706 B2* | 2/2016 | Karczewicz | H04N 19/103 | |
| 9,294,769 B2* | 3/2016 | Jeon | H04N 19/91 | |
| 9,338,449 B2* | 5/2016 | Sole Rojals | H04N 19/463 | |
| 9,497,472 B2* | 11/2016 | Coban | H04N 19/102 | |
| 9,538,175 B2* | 1/2017 | Karczewicz | H04N 19/463 | |
| 9,544,584 B2* | 1/2017 | Lim | H04N 19/176 | |
| 9,544,597 B1* | 1/2017 | Han | H04N 19/625 | |
| 9,571,860 B2* | 2/2017 | Sze | H04N 19/13 | |
| 9,596,464 B2* | 3/2017 | Song | H04N 19/436 | |
| 9,661,338 B2* | 5/2017 | Karczewicz | H04N 19/176 | |
| 9,693,054 B2* | 6/2017 | Jeon | H04N 19/182 | |
| 9,800,870 B2* | 10/2017 | Guo | H04N 19/159 | |
| 10,440,369 B2* | 10/2019 | Young | H04N 19/147 | |
| 10,484,695 B2* | 11/2019 | Young | H04N 19/176 | |
| 10,645,381 B2* | 5/2020 | Joshi | H04N 19/70 | |
| 10,893,280 B2* | 1/2021 | Young | H04N 19/13 | |
| 11,178,409 B2* | 11/2021 | Young | H04N 19/91 | |
| 11,477,462 B2* | 10/2022 | Young | H04N 19/124 | |
| 2011/0188572 A1* | 8/2011 | Min | H04N 19/46 | 375/E7.243 |
| 2012/0082218 A1* | 4/2012 | Misra | H04N 19/174 | 375/E7.243 |
| 2012/0195377 A1* | 8/2012 | Auyeung | H04N 19/176 | 375/E7.243 |
| 2012/0230417 A1* | 9/2012 | Sole Rojals | H04N 7/00 | 375/240.18 |
| 2013/0188699 A1* | 7/2013 | Joshi | H04N 19/42 | 375/240.12 |
| 2013/0230097 A1* | 9/2013 | Sole Rojals | H04N 19/18 | 375/240.02 |
| 2013/0315300 A1* | 11/2013 | Lee | H04N 19/70 | 375/240.02 |
| 2013/0329784 A1* | 12/2013 | Chuang | H04N 19/176 | 375/240.02 |
| 2013/0329786 A1* | 12/2013 | Thoreau | H04N 19/176 | 375/240.12 |
| 2014/0119439 A1* | 5/2014 | Guo | H04N 19/70 | 375/240.12 |
| 2015/0110173 A1* | 4/2015 | Bultje | H04N 19/40 | 375/240.18 |
| 2015/0110409 A1* | 4/2015 | Bultje | H04N 19/13 | 382/239 |
| 2015/0215646 A1* | 7/2015 | Piao | H04N 19/60 | 375/240.18 |
| 2015/0358621 A1* | 12/2015 | He | H04N 19/91 | 375/240.02 |
| 2015/0370787 A1* | 12/2015 | Akbacak | G06F 40/47 | 704/2 |
| 2016/0191917 A1* | 6/2016 | Fu | H04N 19/13 | 375/240.07 |
| 2016/0373741 A1* | 12/2016 | Zhao | H04N 19/70 | |
| 2017/0223378 A1* | 8/2017 | Tao | H04N 19/56 | |
| 2017/0310998 A1* | 10/2017 | Zhao | H04N 19/182 | |
| 2017/0318311 A1* | 11/2017 | Said | H04N 19/14 | |
| 2018/0063547 A1* | 3/2018 | Kobayashi | G06T 7/223 | |
| 2018/0199054 A1* | 7/2018 | Hsu | H04N 19/176 | |
| 2018/0199062 A1* | 7/2018 | Zhang | H04N 19/59 | |
| 2021/0365811 A1* | 11/2021 | Xu | G06N 5/022 | |
| 2022/0343555 A1* | 10/2022 | Zhang | G06T 7/10 | |

OTHER PUBLICATIONS

Bankoski et al., "VP8 Data Format and Decoding Guide draft-bankoski-vp8-bitstream-02", Network Working Group, Internet-Draft, May 18, 2011, 288 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

Bankoski, et al., "Technical Overview of VP8, An Open Source Video Codec for the Web", Jul. 11, 2011, 6 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

"VP8 Data Format and Decoding Guide, WebM Project", Google On2, Dec. 1, 2010, 103 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

Vivienne Sze et al. "Chapter 8: Entropy Coding in HEVC", High Efficiency Video Coding (HEVC), Springer International Publishing, Jan. 1, 2014, pp. 209-269.

T. Nguyen et al., "Non-CE11: Proposed Cleanup for Transform Coefficient Coding", Joint Collaborative Team on Video Coding (JCT-VC) of ITU-T SG16 WP3 and ISO/IEC JTC1/SC29/WG11, 8th Meeting, San Jose, CA, Feb. 1-10, 2012, http://wftp3.itu.int/av-arch/jctvc-site/, Document No. JCTVC-H0228 (Jan. 20, 2012), 6 pgs.

International Search Report and Written Opinion in PCT/US2019/015930, dated Apr. 30, 2019, 17 pgs.

Joel Sole et al, "Transform Coefficient Coding in HEVC"; IEEE Transactions on Circuits and Systems for Video Technology, Institute of Electrical and Electronics Engineers, vol. 22, No. 12, Dec. 1, 2012, pp. 1765-1777.

* cited by examiner

EFFICIENT CONTEXT MODEL COMPUTATION DESIGN IN TRANSFORM COEFFICIENT CODING

CROSS-REFERENCE TO RELATED APPLICATION(S)

This application is a continuation of U.S. application patent Ser. No. 17/106,898, filed, Nov. 30, 2020, which is a continuation of U.S. application patent Ser. No. 16/693,438, filed Nov. 25, 2019, which is a continuation in part of U.S. application patent Ser. No. 15/883,323, filed Jan. 30, 2018, the entire disclosures of which are hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

A first aspect is an apparatus for decoding a transform block of transform coefficients. The apparatus includes a processor that is configured to execute instructions to obtain a transform type for decoding the transform block; select, based on the transform type, a template for entropy-decoding values related to the transform coefficients, the template indicating, for a to-be-coded value, positions of already coded values; determine, using the template, a context for selecting a probability distribution for entropy decoding a current value of the values; and entropy decode, from a compressed bitstream, the current value using the probability distribution.

A second aspect is a method for decoding a transform block of transform coefficients. The method includes obtaining a transform type for decoding the transform block; selecting, based on the transform type, a template for entropy-decoding values related to the transform coefficients, the template indicating, for a to-be-coded value, positions of already coded values; determining, using the template, a context for selecting a probability distribution for entropy decoding a current value of the values; and entropy decoding, from a compressed bitstream, the current value using the probability distribution.

A third aspect is a non-transitory computer readable medium storing instructions operable to cause one or more processors to perform operations for decoding a transform block of transform coefficients. The operations include obtaining a transform type for decoding the transform block; selecting, based on the transform type, a template for entropy-decoding values related to the transform coefficients, the template indicating, for a to-be-coded value, positions of already coded values; determining, using the template, a context for selecting a probability distribution for entropy decoding a current value of the values; and entropy decoding, from a compressed bitstream, the current value using the probability distribution.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
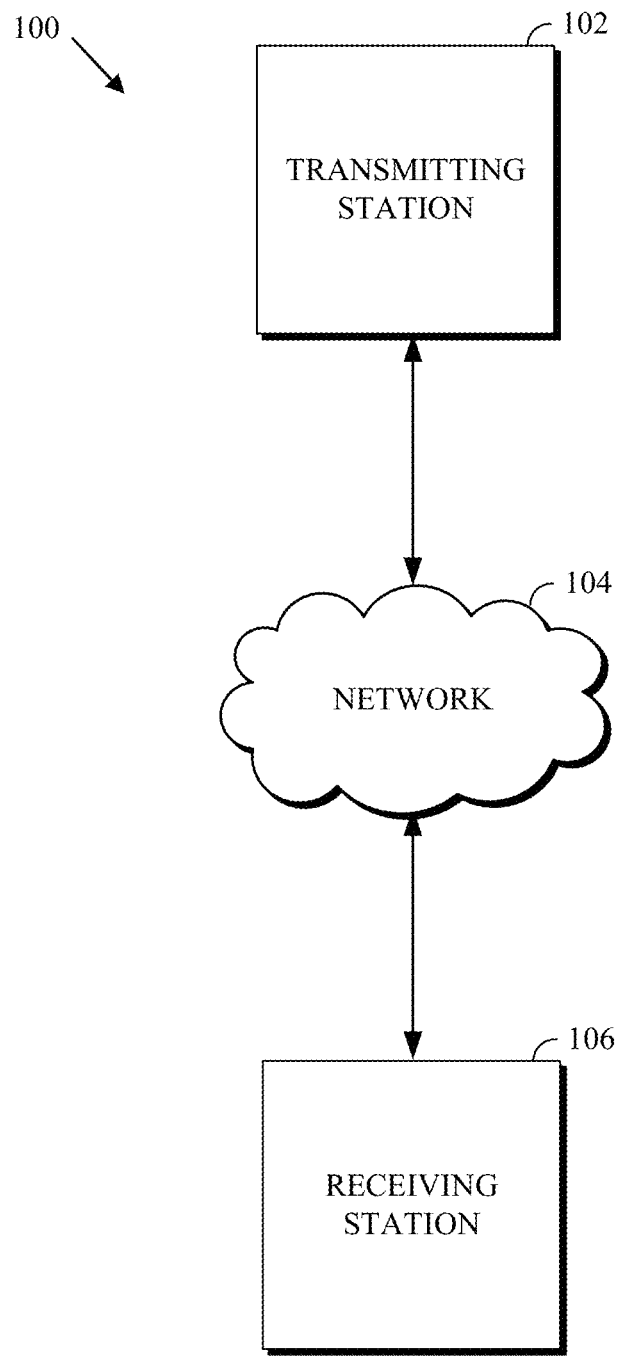
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer. As such, one or more reference frames can be available for coding a current frame.

As mentioned above, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

The residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients).

Encoders may use techniques to decrease the amount of bits spent on transform coefficient coding. For example, level maps, as further described below, can be used for coding transform coefficients. Herein, for brevity and unless otherwise clear from the context, transform coefficient(s) means quantized transform coefficient(s), and transform block(s) means quantized transform coefficients.

The values of the transform coefficients can be split into two planes: a lower plane and a higher plane. A maximum level is associated with the lower plane. The lower plane indicates for a transform coefficient a value that is "up to whether the coefficient is less than or equal the maximum level." For example, if the maximum level is 2, then the lower plane indicates whether a coefficient is 0, 1, 2, or greater than 2. As such, "up to whether the coefficient is less than or equal 2" means that the lower plane indicates that the value of a coefficient is either 0, 1, 2, or greater than 2. Any coefficient whose value is greater than 2 (e.g., the maximum level) can be represented in lower plane with one value that indicates "greater than 2" (i.e., 3 or above). The higher plane corresponds to coefficient values that are, in this example, 3 or above. As such, each of the values of the lower plane can be one of four values, namely 0, 1, 2, or "greater than 2." In an example, a coefficient that is greater than 2 can be represented by the value 3 in the lower plane.

In general, the lower plane (i.e., values of the lower plane) appears much more frequently than the higher plane. This is so because for every value of higher plane, a corresponding value necessary exists in the lower plane. However, some of the values of the lower plane may not have corresponding values in the higher plane. For example, a transform coefficient with a value of 7 would have corresponding values in the lower plane (e.g., a value of 3 since 7 is greater than 2) and a value in the lower plane (e.g., 5). However, a transform coefficient with a value of 2 does not have a corresponding value in the higher map. As such, the compression performance (i.e., speed of compression) of the lower plane can have a significant impact on the overall compression performance.

As described above, entropy coding a sequence of symbols is typically achieved by using a probability model to determine a probability p for the sequence and then using binary arithmetic coding to map the sequence to a binary codeword at the encoder and to decode that sequence from the binary codeword at the decoder. The length (i.e., number of bits) of the codeword is given by −log(p). The efficiency of entropy coding can be directly related to the probability model. Throughout this document, log denotes the logarithm function to base two (2) unless specified otherwise.

A model, as used herein, can be, or can be a parameter in, a lossless (entropy) coding. A model can be any parameter or method that affects probability estimation for entropy coding.

A purpose of context modeling is to obtain probability distributions for a subsequent entropy coding engine, such as arithmetic coding, Huffman coding, and other variable-length-to-variable-length coding engines. To achieve good compression performance, a large number of context models may be required. For example, some video coding systems can include hundreds or even thousands of context models for transform coefficient coding alone. Each context model can correspond to a probability distribution.

As already mentioned, residuals for a block of video are transformed into transform blocks of transform coefficients. The transform blocks are in the frequency domain and one or more transform blocks may be generated for a block of video. The transform coefficients are quantized and entropy coded into an encoded video bitstream. A decoder uses the encoded transform coefficients and the reference frames to reconstruct the block. Entropy coding a transform coefficient involves the selection of a context model (also referred to as probability context model or probability model) which provides estimates of conditional probabilities for coding the binary symbols of a binarized transform coefficient.

The available context models in a codec may be available as a list, an array, a file, or some other suitable data structure. The list of context models can be ordered. That is, a respective context index can be associated with each context model. As such, selecting a context model can involve determining a context index. The context index is then used to select (e.g., retrieve, access, etc.) the corresponding context model.

Coding the transform coefficients of a transform block, such as coding the values of the lower plane corresponding to the transform block, can include visiting each value of the lower plane, determining a context index for the value of the lower plane, retrieving the context model associated with the context index, and entropy coding the value using the context model.

The values of the lower plane are visited (e.g., processed) along a scan order. The scan order can also be referred to as a processing order. Visiting the values of the lower plane along a scan order can include generating a one-dimensional array. Determining a context index, for a current transform coefficient of a transform block, can include accessing other values in the one-dimensional array. These other values are values that correspond to other transform coefficients that neighbor the current transform coefficients in the 2-dimensional transform block. While these other transform coefficients may neighbor the current transform coefficient block in the 2-dimensional block, the corresponding values may not be neighboring values in the one-dimensional array. The arrangement of the values of the lower plane in the on-dimensional array depends on the scan order.

As further explained below with respect to FIG. 12, accessing the respective other values for each transform coefficient can impose certain computational barrier, especially for the decoder speed.

Implementations of this disclosure can result in improved compression performance by arranging and accessing values of the lower plane that are required for determining context indexes in such ways as to optimize memory access. The values of the lower plane can be arranged along anti-diagonal lines of a scan order in one or more line buffers such that determining a context index for a value of the lower plane accesses contiguous locations in two or more line buffers. A scan order that aligns values along anti-diagonal lines and methods for accessing the values from line buffers are described.

By integrating the scan order (e.g., processing order) of the values of the lower plane and the computation method of a context index, access to non-contiguous locations of line buffers can be reduced and parallel computing can be exploited. As such, implementations of this disclosure can have reduced computational.

Efficient context model computation design in transform coefficient coding is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
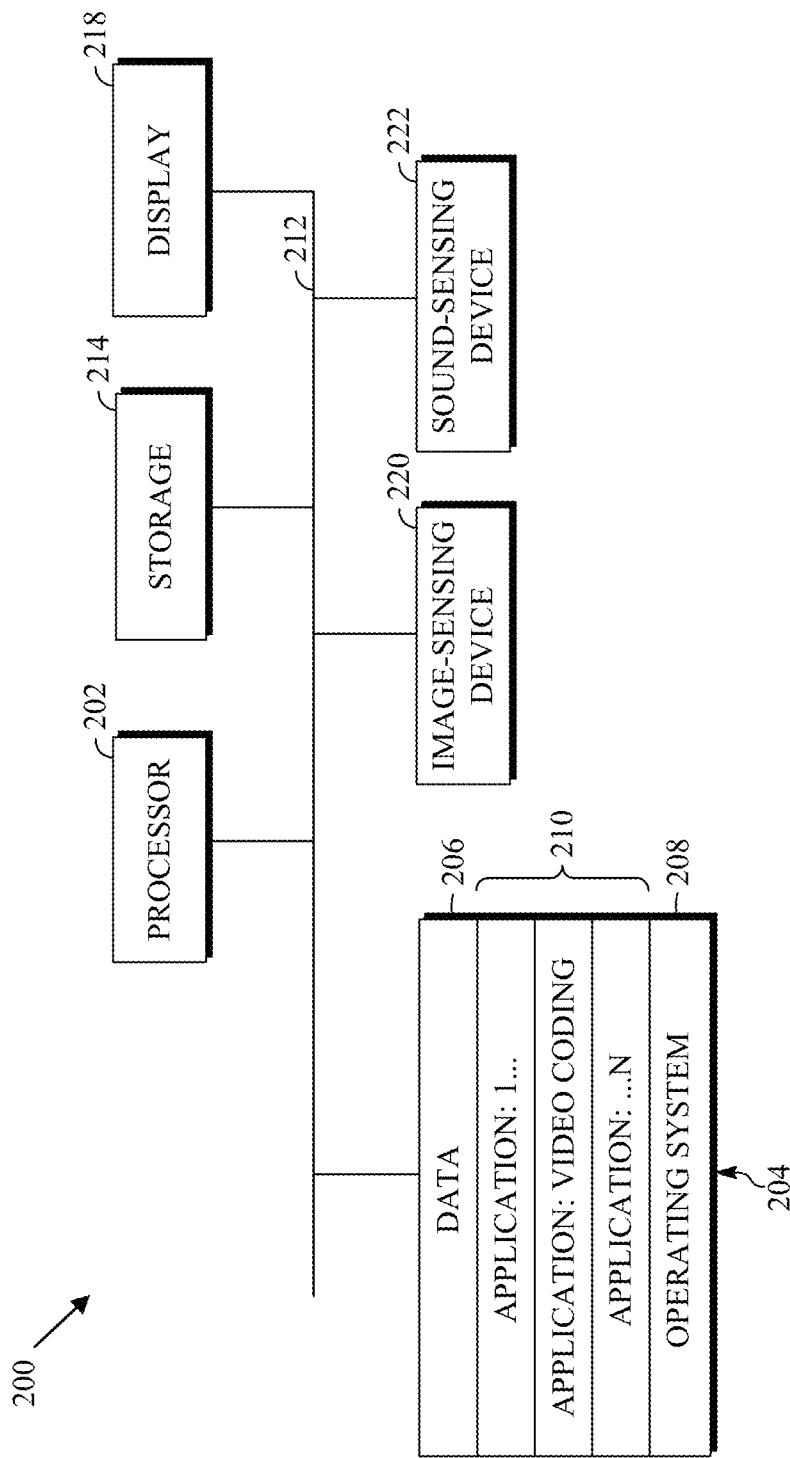
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
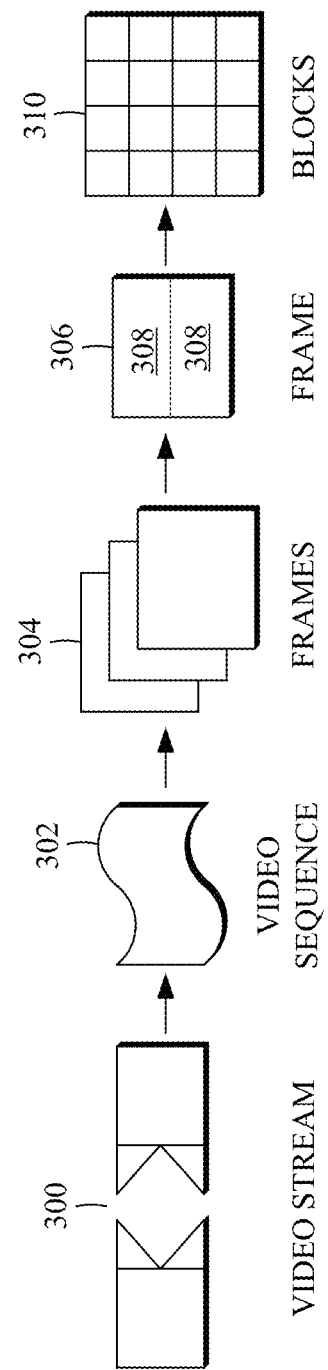
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
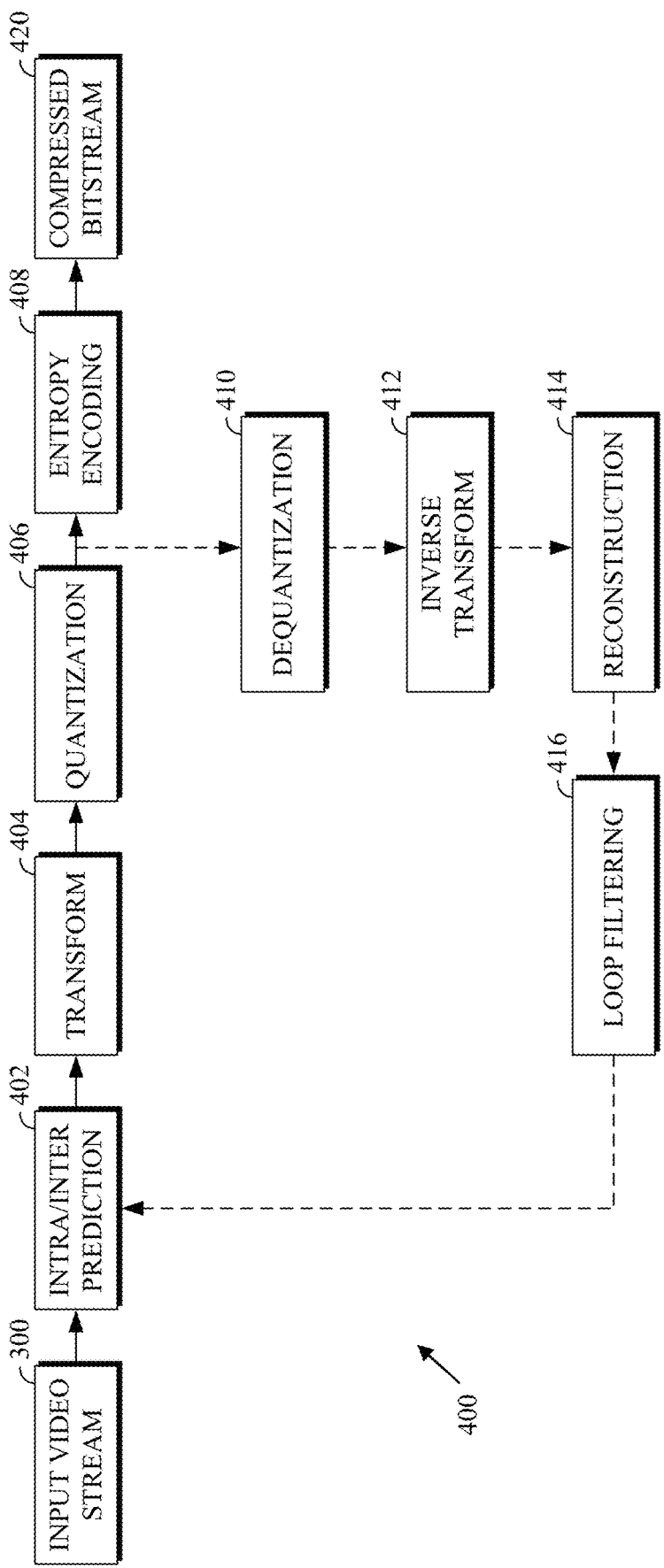
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
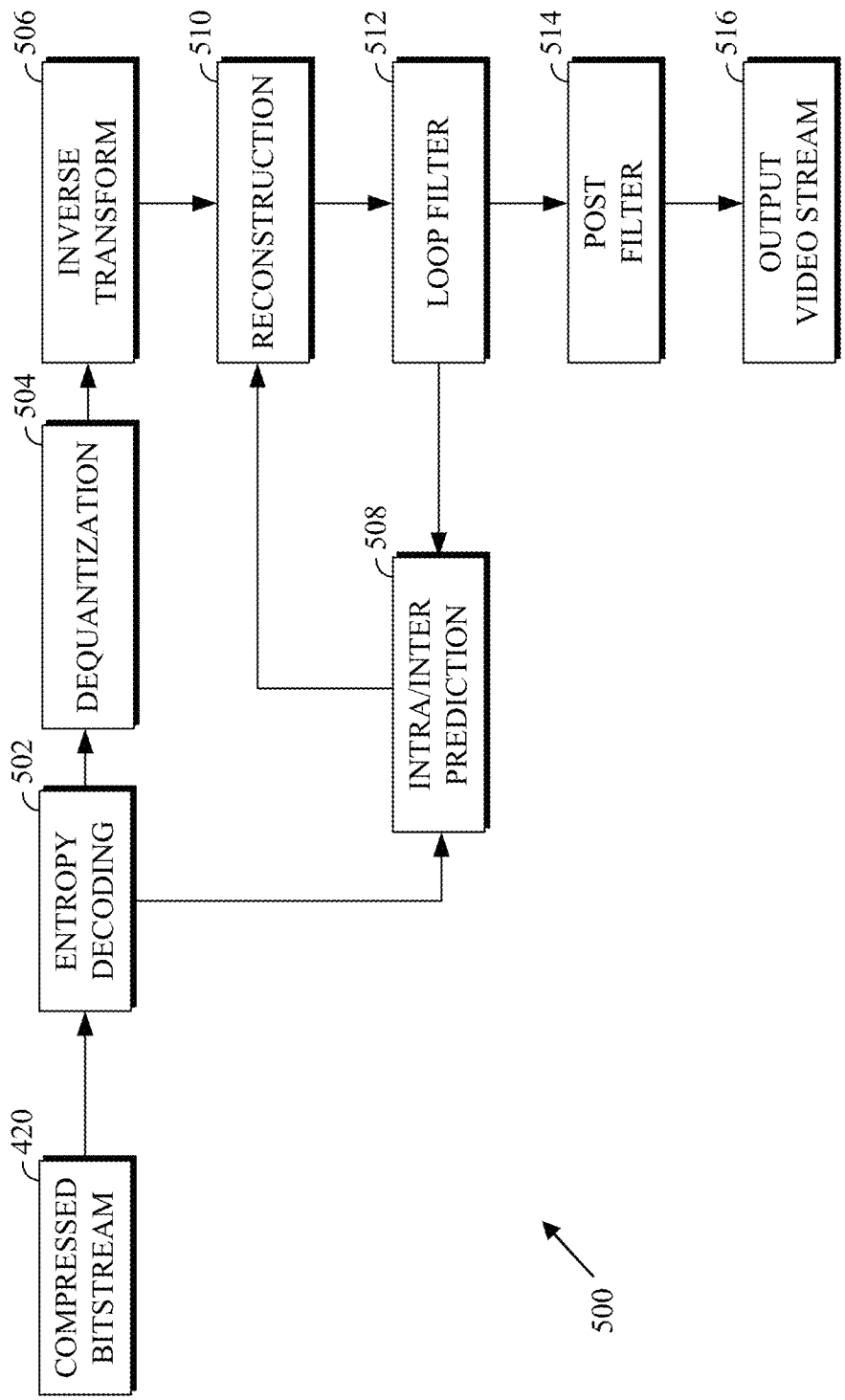
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Some codecs may use level maps to code (i.e., encode by an encoder or decode by a decoder) a transform block. That is, some codecs may use level maps to code the transform coefficients of the transform blocks. In level map coding, the transform block is decomposed into multiple level maps such that the level maps break down (i.e., reduce) the coding of each transform coefficient value into a series of binary decisions each corresponding to a magnitude level (i.e., a map level). The decomposition can be done by using a multi-run process. As such, a transform coefficient of the transform block is decomposed into a series of level binaries and a residue according to the equation:

$$\text{coefficient}\,[r][c] = \left\{\left(\sum_{k=0}^{T} \text{level}_k[r][c]\right) + \text{residue}[r][c]\right\} * \text{sign}[r][c]$$

Where $\text{residue}[r][c] = \text{absolute}(\text{coefficient}[r][c]) - T - 1$ $$\text{sign}\,[r][c] = \begin{cases} 1 & \text{if coefficient}\,[r][c] > 0 \\ -1 & \text{if coefficient}\,[r][c] < 0 \end{cases}$$

In the above equation, coefficient[r][c] is the transform coefficient of the transform block at the position (row=r, column=c), T is the maximum level, $level_k$ is the level map corresponding to map level k, residue is a coefficient residual map, and sign is the sign map of the transform coefficients. These terms are further described below with respect to FIG. 7. The transform coefficients of a transform block can be re-composed using the same equation, such as by a decoder, from encoded $level_k$ maps, residual map residue, and sign map sign.

A zeroth run can be used to determine a non-zero map (also referred to as a level-0 map) which indicates which transform coefficients of the transform block are zero and which are non-zero. Level maps corresponding to runs 1 through a maximum (i.e., threshold) level T (i.e., level-1 map, level-2 map, . . . , level-T map) are generated in ascending order from level 1 to the maximum level T. The level map for level k, referred to as the level-k map, indicates which transform coefficients of the transform block have absolute values greater to or equal to k. The level maps are binary maps. A final run generates a coefficients residue map. If the transform block contains transform coefficient values above the maximum level T, the coefficients residue map indicates the extent (i.e., residue) that these coefficients are greater than the maximum level T.

When generating (i.e., coding) the level-k map, only the positions (r, c) corresponding to positions (r, c) of the level-(k−1) map which are equal to 1 (i.e., $level_{k-1}[r][c]=1$) need be processed—other positions of the level-(k−1) are determined to be less than k and, therefore, there is no need to process them for the level-k map. This reduces processing complexity and reduces the amount of binary coding operations.

As the level maps contain binary values, the above and left neighbors of a value to be encoded are binary values. A context model based on the binary values of any number of previously coded neighbors can be determined. The context model can fully utilize information from all these neighbors. The previously coded neighbors can be neighbors in the same level map or a preceding level map, such as an immediately preceding level map. The immediately preceding map of the level-k (e.g., level-2) map is the level-(k−1) (e.g., level-1) map. Contexts according to this disclosure can be less complex thereby resulting in efficient models for coding the level maps.

When encoding a level-k map, the fully coded level-(k−1) map and the partially coded level-k map can be used as context information for context modeling. As compared to transform coefficient coding of other video systems, which code one coefficient value at a time before moving to next transform coefficient, implementations of this disclosure can reduce the cardinality of the reference sample set. This is so because, as further described herein, the information from the level-(k−1) map and partially coded level-k map are binary information. The binary information enables the use of sophisticated spatial neighboring templates for context modeling binary information. Such spatial neighboring templates can better capture statistical characteristics of transform blocks, especially those with larger transform block sizes.

Figure 6:
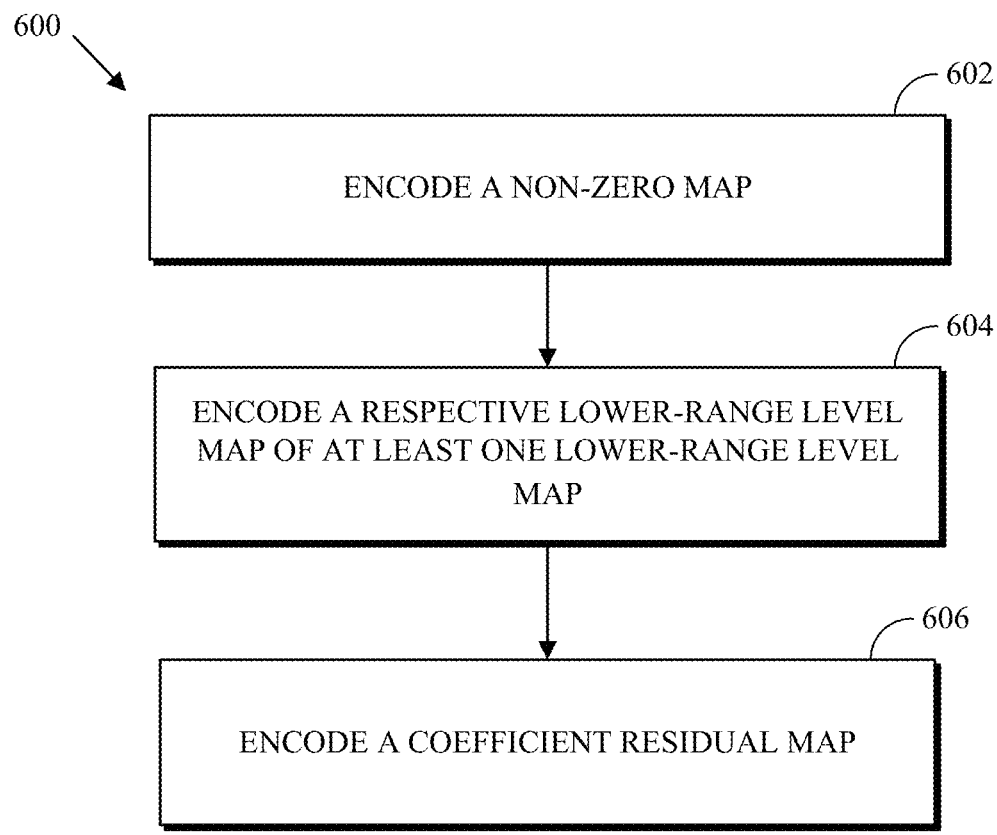
FIG. 6 is a flowchart diagram of a process for encoding a transform block in an encoded video bitstream using level maps according to an implementation of this disclosure.

FIG. 6 is a flowchart diagram of a process 600 for encoding a transform block in an encoded video bitstream using level maps according to an implementation of this disclosure. The process 600 can be implemented in an encoder such as the encoder 400. The encoded video bitstream can be the compressed bitstream 420 of FIG. 4.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the entropy encoding stage 408 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Figure 7:
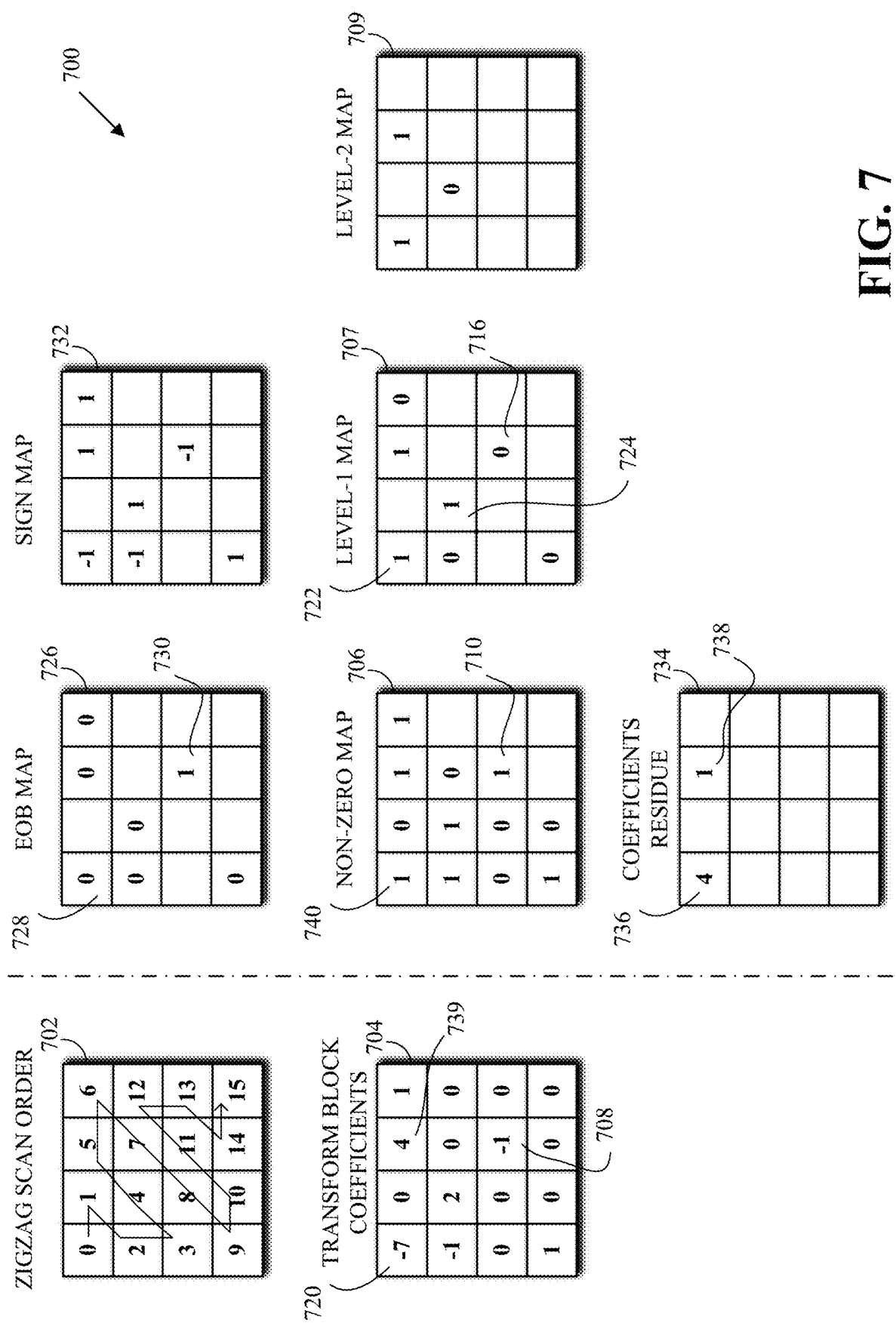
FIG. 7 is a diagram illustrating the stages of transform coefficient coding using level maps in accordance with implementations of this disclosure.

The process 600 is now explained with reference to FIG. 7. FIG. 7 is a diagram illustrating the stages 700 of transform coefficient coding using level maps in accordance with implementations of this disclosure. FIG. 7 includes the zigzag forward scan order 702, a transform block 704, a non-zero map 706, a level-1 map 707, a level-2 map 709, an end-of-block map 726, a sign map 732, and a coefficient residual map 734.

The process 600 can receive a transform block, such as the transform block 704 of FIG. 7. The transform block can be received from the quantization step of an encoder, such as the quantization stage 406 of the encoder 400 of FIG. 4. The transform block 704 includes zero and non-zero transform coefficients. Some of the non-zero coefficients may be negative values.

At 602, a non-zero map is encoded. The non-zero map indicates positions of the transform block that contain non-zero transform coefficients. The non-zero map can also be referred to as the level-0 map.

The non-zero map 706 of FIG. 6 illustrates a non-zero map. The non-zero map can be generated by traversing the transform block 704 in a scan order, such as the zigzag forward scan order 702 of FIG. 7, and indicating in the non-zero map 706, using binary values, whether the corresponding transform coefficient is a zero or a non-zero. In the non-zero map 706, a non-zero transform coefficient of the transform block 704 is indicated with the binary value 1 (one) and a zero transform coefficient is indicated with the binary value 0 (zero). However, the indication can be reversed (i.e., a zero to indicate a non-zero transform coefficient and one (1) to indicate a zero transform coefficient).

In an implementation, zero transform coefficients that are beyond (i.e., come after) the last non-zero transform coefficient, based on the scan order of the transform block, are not indicated in the non-zero map. For example, using the zigzag forward scan order 702 to scan the transform block 704, the last non-zero transform coefficient 708, corresponding to scan position 11, is the last indicated transform coefficient in the non-zero map 706 at last non-zero coefficient 710. No values are indicated in the non-zero map 706 for the transform coefficients corresponding to the scan positions 12-15 of the zigzag forward scan order 702.

At 604, the process 600 encodes a respective lower-range level map. Each lower-range map has a map level up to a maximum level. A lower-range level map indicates which values of the non-zero transform coefficients are equal to the map level of the lower-range map and which values of the non-zero transform coefficients are greater than the map level.

For each map level k, up to the maximum level T, a lower-range level map level$_k$ is encoded. Each lower-range level map indicates which values of the transform block are equal to the map level of the lower-range level map and which values of the transform block are greater than the map level. As such, the process 600, using multiple runs (i.e., each run corresponding to a level k=1, 2, . . . , T), breaks down the coding of transform coefficients into a series of binary decisions each corresponding to a magnitude level. The binary decision of a coefficient at row and column (r, c) in the transform block at level k can be defined by:

$$level_k[r][c] = 1 \text{ if absolute (coefficient}[r][c]) > k$$
$$= 0 \text{ if absolute(coefficient}[r][c]) \le k$$

For example, for k=1 (i.e., for the level-1 map 707), the process 600 determines for each transform coefficient of the transform block 704 whether the absolute value of the transform coefficient is greater than k (i.e., 1) or less than or equal to k. For the transform coefficient 720 (i.e., at r=0, c=0), as the absolute value of −7 (i.e., |−7|=7) is greater than 1, the process 600 sets the corresponding value 722 of the level-1 map 707 to 1. For the last non-zero transform coefficient 708 (i.e., at r=2, c=2), as the absolute value of −1 (i.e., |−1|=1) is equal to k (i.e., 1), the process 600 sets the corresponding value 716 of the level-1 map 707 to 0. The last non-zero transform coefficient in the transform block (e.g., the last non-zero transform coefficient 708) can be referred to as the highest AC coefficient).

In an implementation, to generate a lower plane, the process 600 can scan the preceding level map backwards starting at the last 1 value of the previous level map. For a level-k map, the preceding level map is the level-(k−1) map corresponding to the preceding map level (k−1). That is, for k=2, the preceding level map is the level-1 map. For k=1, the preceding level map is the level-0 map (i.e., the non-zero map). For the level-1 map 707, scanning of the non-zero map 706 starts at the last non-zero coefficient 710. For the level-2 map 709, scanning of the level-1 map 707 starts at the last non-zero coefficient 724. In generating a level-k map, the process 600 need only process the transform coefficients corresponding to 1 values in the level-(k−1). The process 600 need not process the transform coefficients corresponding to non 1 values as those values are already determined to either be equal to k−1 (i.e., the zero values of the level-(k−1) map) or are less than k−1 (i.e., the blank values of the level-(k−1) map).

In an implementation, the maximum level T can be fixed. For example, the maximum level T can be provided as a configuration to the process 600, the maximum level T can be hard-coded in a program that implements the process 600, or the maximum level T can be set statistically or adaptively based on previously coded transform blocks or other blocks of the encoded video bitstream. Alternatively, the maximum level T is determined by the process 600. That is, the process 600 can test different values for the maximum level T (i.e., T=1, 2, 3, 4, . . . ) and determine which value provides the best compression performance. The value of the maximum level T that results in the best compression can be encoded in the video bitstream, which a decoder, such as the decoder 500 of FIG. 5 can decode and use. A maximum level T of 2 or 3 has been determined to provide acceptable compression as compared to other values for the maximum level T.

At 606, the process 600 encodes a coefficient residual map. Each residual coefficient of the coefficient residual map corresponds to a respective (i.e., co-located) non-zero transform coefficient of the transform block having an absolute value exceeding the maximum level. The residual coefficient for a transform coefficient at location (r, c) of the transform block can be calculated using the formula (1):

$$\text{residue}[r][c] = \text{absolute(coefficient}[r][c]) - T - 1 \tag{1}$$

FIG. 7 illustrates a coefficients residue map 734. In the example of FIG. 7, the maximum level T is equal to two (2). As such, the coefficients residue map 734 contains the residuals of the transform coefficients of the transform block 704 the absolute values of which are greater than 2. A residual coefficient is the extent to which the absolute value of a transform coefficient exceeds the maximum level T. The absolute values of two values of the transform block 704 are greater than the value of the maximum level T (i.e., 2), namely the transform coefficient 720 (i.e., |−7|=7>2) and transform coefficient 739 (i.e., |4|=4>2). Respectively, the coefficients residue map 734 includes residual 736 and residual 738. Using the formula (1), the residual 736 is set to 5 (i.e., absolute(−7)−3=4) and the residual 738 is set to 1 (i.e., absolute(4)−3=1).

The residual coefficients of the coefficients residue map 734 can be encoded in the encoded video bitstream using binary coding. A probability distribution that fits the statistics of the residual coefficients of the coefficients residue map can be used. The probability distribution can be a geometric distribution, a Laplacian distribution, a Pareto distribution, or any other distribution.

Encoding the residual coefficients in the encoded video bitstream provides several benefits, such as over video coding systems that encode the transform coefficients. As each residual coefficient is smaller in magnitude than its corresponding transform coefficient, less bits are required to encode the residual coefficient. Additionally, as there are fewer residual coefficients to encode (e.g., 2 in the coefficient residual map 734 of FIG. 7) than non-zero transform coefficients (e.g., 7 in the transform block 704 of FIG. 7), additional compression can result.

In an implementation of the process 600, a sign map can also be encoded. A sign map indicates which transform coefficients of the transform block have positive values and which transform coefficients have negative values. Transform coefficients that are zero need not be indicated in the sign map. The sign map 732 of FIG. 7 illustrates an example of a sign map for the transform block 704. In the sign map, negative transform coefficients are indicated with a −1 and positive transform coefficients are indicated with a 1. In some implementations, the sign of a positive coefficient may be indicated with a 0 and the sign of a negative coefficient may be indicated with a 1.

In an implementation of the process 600, encoding a non-zero map, at 602, can also include generating an end-of-block map for the transform block and interleaving the non-zero map and the end-of-block map in the encoded video bitstream.

The end-of-block map indicates whether a non-zero transform coefficient of the transform block is the last non-zero coefficient with respect to a given scan order. If a non-zero coefficient is not the last non-zero coefficient in the transform block, then it can be indicated with the binary value 0 (zero) in the end-of-block map. If, on the other hand, a non-zero coefficient is the last non-zero coefficient in the transform block, then it can be indicated with the binary value 1 (one) in the end-of-block map.

For example, as the transform coefficient 720 of the transform block 704 is followed by another non-zero transform coefficient (e.g., the transform coefficient-1 corresponding to scan location 2), the transform coefficient 720 is not the last non-zero transform coefficient, it is indicated with the end-of-block value 728 of zero. On the other hand, as the transform coefficient corresponding to the scan location 11 (i.e., the last non-zero transform coefficient 708) is the last non-zero coefficient of the transform block 704, it is indicated with the end-of-block value 730 of 1 (one).

The process 600 can, by traversing the non-zero map and the end-of-block maps in a same scan order, interleave values from the non-zero map 706 and the end-of-block map 726 in the encoded bitstream. The process 600 can use the zigzag forward scan order 702 or any arbitrary scan order. For each position (r, c), the value at that row and column of the non-zero map 706 (i.e., nz_map[r][c]) is coded first. If the value nz_map[r][c] is 1, then the corresponding value from the end-of-block map 726 (i.e., eob_map[r][c]) is coded next to indicate whether the position (r, c) of the transform block 704 contains the last nonzero transform coefficient. The process 600 ends the coding of the non-zero map (e.g., the non-zero map 706) when eob_map[r][c] equals to 1 or when the last position in the transform block (e.g., the scan position 15 of the zigzag forward scan order 702) is reached. That is, when encoding a value of 1 from the non-zero map 706, the value is followed by another syntax element (i.e., a value to be encoded in the encoded video bitstream) from a corresponding (i.e., co-located) end-of-block map 726 value to indicate whether the 1 value is the last 1 value of the non-zero map 706.

In an implementation, encoding a non-zero map, at 602, can also include determining a coding context for a value (i.e., to-be-coded value) of the non-zero map. The coding context of a to-be-coded value at a current position (r, c) can be based on previously coded non-zero neighboring values of the to-be-coded value in the non-zero map. The coding context can also be based on the position of the to-be-coded value within the non-zero map.

As mentioned above, the context information can be determined based on the number of non-zero previously coded neighbors of the current position and can be calculated using the sum $$\text{non\_zero\_map\_sum}(r,c) = \sum_{(r',c') \in nb(r,c)} nz\_map(r',c') \quad (2)$$

In equation (2), non_zero_map_sum(r, c) is the number of non-zero previously coded neighbors of the to-be-coded value of the non-zero block at position (r, c), nb(r,c) is the set of previously coded neighbors of the to-be-coded value at location (r,c) of the non-zero map, and nz_map(r',c') is the value at position (r', c') in the non-zero map. Equation (1) is further explained with reference to FIG. 8.

Figure 8:
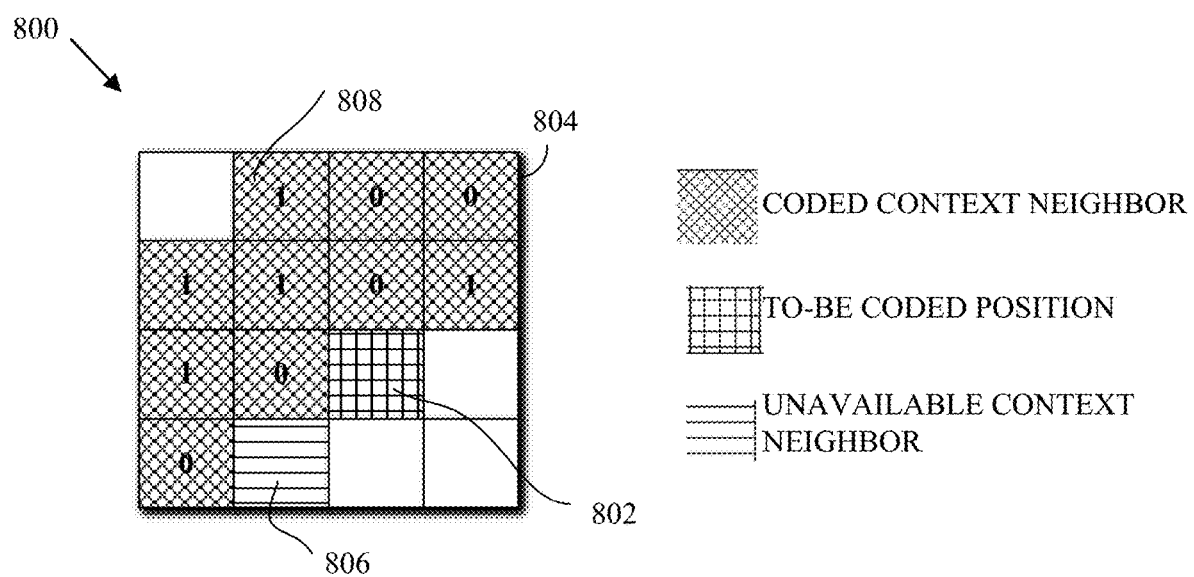
FIG. 8 is a diagram of previously coded neighbors in a non-zero map according to an implementation of this disclosure.

FIG. 8 is a diagram of previously coded neighbors in a non-zero map 800 according to an implementation of this disclosure. FIG. 8 includes a to-be-encoded value, current value 802, an unavailable context neighbor 806 (i.e., a neighboring value for which context information is not available), and coded context neighbors, such as coded context neighbor 808. Ten coded context neighbors are illustrated. Which values are included in the set of neighbors depends on the scan order. For example, using the zigzag forward scan order 702 of FIG. 7, the set of neighbors illustrated in FIG. 8 includes the coded context neighbors 804 which includes neighbors that are above and to the left of the current value 802. For the current value 802, non_zero_map_sum(2,2)=5. This value (i.e., 5) can be used as context information to determine a probability model for coding the current value 802 of the non-zero map 800.

As indicated above, the coding context can also be based on the position of the to-be-coded value within the non-zero map or, equivalently, in the transform block. The positions of the transform block can be grouped into context groups. For example, four context groups can be set: a first group corresponding to the DC coefficient (i.e., r=0 and c=0), a second group corresponding to the top row except for the AC coefficient (i.e., r=0 and c>0), a third group corresponding to the left-most column except for the AC coefficient (i.e., r>0 and c=0), and a fourth group corresponding to all other coefficients (i.e., r>0 and c>0). As such, the current value 802 corresponds to the fourth context group.

In an implementation, encoding a non-zero map, at 602, can also include determining a coding context for each value of the end-of-block map. The process 600 can determine a context model for a to-be-encoded value of the end-of-block map based on the location of the to-be-encoded value with respect to the frequency information of the transform block. That is, the position of the transform coefficient in the transform block can be used as the context for determining the context model for encoding a corresponding (i.e., co-located) to-be-encoded value of the end-of-block map. The transform block can be partitioned into areas such that each area corresponds to a context. The partitioning can be based on the rationale that the likelihood is very low that the end-of-block is at the DC location of the transform block but that the likelihood increases further from the DC coefficient.

In some implementations, a lower-range level map can be a binary map having dimensions corresponding to the dimensions of the transform block and, as indicated above, a map level k. A position of the lower-range level map can be set to one (1) when a corresponding value in the preceding level map (i.e., level map k−1 as described below) is one (1) and the corresponding transform coefficient is greater than the map level k of the lower-range level map. A position of the lower-range level map can be set to a value of zero when a corresponding value in the preceding level map has a value of one and the corresponding transform coefficient is equal to the map level k of the lower-range level map. A position of the lower-range level map can have no value when a corresponding value in the preceding level map has a value of zero.

In an implementation of the process 600, encoding a lower-range level map for a level, at 604, can also include determining, based on a scan order of the lower-range level map, a level-map coding context for a value of the lower-range level map. As indicated above, encoding a value of a lower-range level map k amount to encoding a binary value, namely whether the corresponding (i.e., co-located) transform coefficient of the transform block is equal k or is above k. The encoding of binary values results in simple contexts. As such, multiple neighboring values of a value can be used as the context for determining a context model for the value.

As also indicated above, scanning of the lower-range level map can proceed in a backwards scan order. As such, when encoding a value, neighboring values below and to the right of the to-be-encoded value (if, for example, the scan order is the zigzag forward scan order or 702 of FIG. 7) will have already been encoded. Therefore, first neighboring values (e.g., below and right neighboring values) in the lower-range level map can be used as context. Additionally, second neighboring values (e.g., top and left neighboring values) in the immediately preceding level-(k−1) map can also be used as context. The preceding level map of a lower-range level-k map is the lower-range level-(k−1) map, for k>2; and the preceding level map for the level-1 map is the non-zero map.

As described above, the coding of the transform coefficients is a multi-pass process. In the first pass, the non-zero map 706, which describes the locations of non-zero coefficients in the transform block, is coded following the forward scan order. In subsequent passes, the values of the non-zero coefficients following the backward scan order (i.e., from the position of the highest AC coefficient to the position of the DC coefficient) are coded. Coding the non-zero map 706 can be implemented using the steps:

1. Initialize i=0, where i denotes the scan position, and i=0 corresponds to the DC position (e.g., the transform coefficient 720).
2. Code a binary non-zero flag nz[i] indicating whether the quantized transform coefficient at scan position i is zero. For example, a zero value (nz[i]=0) can be coded when the quantized transform coefficient is zero (i.e., the value in the non-zero map 706 at scan position i is zero); otherwise (the value in the non-zero map 706 at scan position i is 1), a one value (nz[i]=1) is coded. In another example, a zero value (nz[i]=0) can be coded when the quantized transform coefficient is not zero; otherwise, a one value (nz[i]=1) is coded.
3. If nz[i] indicates that the transform coefficient at scan position i is non-zero (e.g., nz[i]=1), then code a binary flag indicating whether all the coefficients at scan positions higher than i are all zero. That is, when a 1 value of the non-zero map 706 is coded, then a value at the same scan position in the end-of-block map 726 is then coded.
4. Set i to the next scan position (i=i+1).
5. Repeat Steps 2-4 until EOB is met (i.e., until the end-of-block value 730 is coded).
6. Set nz[j]=0 for all j>EOB. That is, set all transform coefficients after the end-of-block value 730 to 0.

During the quantization process, such as described with respect to the quantization stage 406 of FIG. 4, a rate distortion optimized quantization (RDOQ) process determines (e.g., calculates, selects, etc.), for transform coefficients of a transform block, respective quantized transform coefficients according to a rate distortion cost of each of the quantized transform coefficients.

For example, in response to receiving a transform coefficient value x, the RDOQ may initially provide a quantized transform coefficient Q(x). The quantized transform coefficient Q(x) may be first obtained by minimizing the distortion (e.g., a loss in video quality). However, when the RDOQ considers the rate (e.g., a number of bits) of coding the quantized transform coefficient(x) in addition to the distortion, the RDOQ may obtain another quantized transform coefficient Q'(x) that provides a better overall rate distortion cost. This process can continue until an optimal quantized transform coefficient is obtained for the transform coefficient value x. As such, the quantized coefficient value of a transform coefficient may change during the coding process of the transform coefficient and/or the transform block that includes the transform coefficient.

As described above, coding the non-zero map 706 uses a forward scan order and coding the subsequent level maps uses a backward scan. As such, estimating the rate cost of changing a transform coefficient value can be difficult since the first pass and the second (or a subsequent) pass of coding use different scan orders: one forward and one backward.

More specifically, in the first pass where the scan order is forward (from the DC coefficient to the highest AC coefficient), a change to the quantized coefficient value at scan position i can impact the rate cost of coding coefficients at scan positions j that follow the scan position i (i.e., j>i); and in the second pass, where the scan order is backward (from the highest AC coefficient to the DC coefficient), a change to the quantized coefficient at scan position i can impact the rate cost of coding coefficients at scan positions j' that precede the scan position i (i.e., j'<i).

As such, to estimate the cost of coding a coefficient at scan position i, information from transform coefficients at scan positions j>i and transform coefficients at scan positions j'<i are required thereby creating a bi-directional dependency. This bi-directional dependency may significantly complicate the RDOQ process.

To avoid the bi-directional dependency, implementations according to this disclosure can, instead of interleaving EOB indications (i.e., end-of-block values of the end-of-block map 726) after non-zero values of the non-zero map 706, first code the EOB symbol and proceed to process the non-zero map 706 in a backward scan order. As such, backward scan orders can be used for all passes of the coding of the transform block using level maps. By using backward scan orders in all passes, only information from transform coefficients at scan positions j following the scan position of a current transform coefficient i (i.e., j>i) are required for estimating the rate cost of coding the coefficient at scan position i. As such, complexity is reduced, which in turns leads to more efficient implementation of the RDOQ. Accordingly, coding a transform block using level maps can be implemented using the steps:

1. Code EOB.
2. Set nz[j]=0 for all j>EOB, and set nz[EOB]=1. Terminate the process if EOB<1.
3. Initialize i=EOB−1.
4. Code nz[i] indicating whether the quantized transform coefficient at scan position i is zero (nz[i]=0) or not (nz[i]=1).
5. Set i=i−1.
6. Repeat Steps 3-5 until i=−1.

In the above steps, the EOB is as described with respect to FIGS. 6-7. That is the EOB indicates the location of the last non-zero coefficient of the transform block. However, other semantics for the EOB are possible. For example, in an implementation, the EOB can indicate the location immediately after the last non-zero coefficient of the transform block. As such, and referring to FIG. 7 for illustration, the EOB would indicate the scan position 12 (instead of the scan position 11 as described with respect to FIGS. 6-7).

When the EOB indicates the position immediately after the last non-zero coefficient, then the steps above can be given by the following:

1. Code EOB.
2. Set nz[j]=0 for all j EOB, and set nz[EOB−1]=1. Terminate the process if EOB≤1.
3. Initialize i=EOB−2.
4. Code nz[i] indicating whether the quantized transform coefficient at scan position i is zero (nz[i]=0) or not (nz[i]=1).
5. Set i=i−1.
6. Repeat Steps 3-5 until i=−1.

Figure 9:
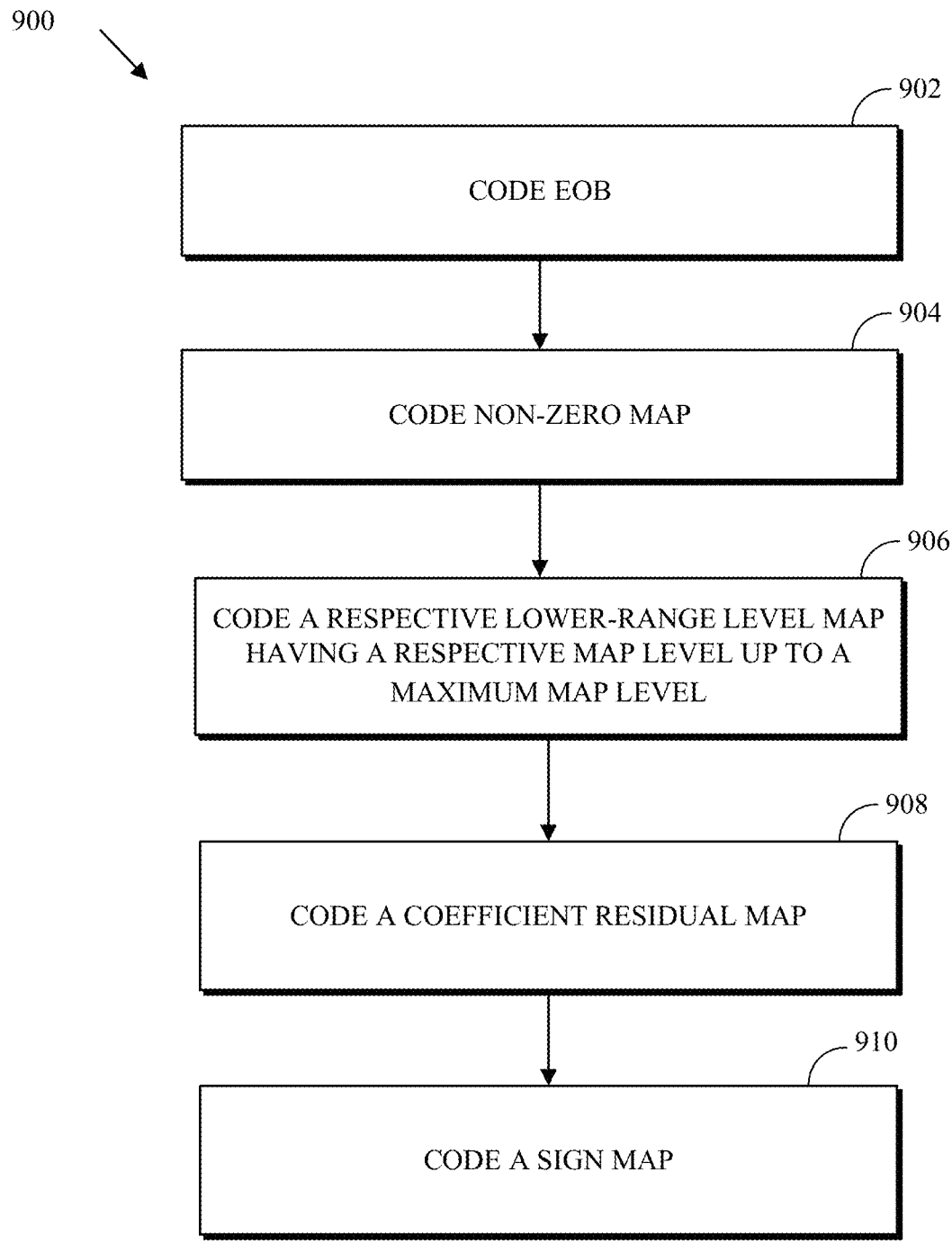
FIG. 9 is a flowchart diagram of a process for coding a transform block using level maps according to an implementation of this disclosure.

FIG. 9 is a flowchart diagram of a process 900 for coding a transform block using level maps according to an implementation of this disclosure. The process 900 can be implemented by an encoder such as the encoder 400 of FIG. 4. When implemented by an encoder, coding means encoding in an encoded bitstream, such as the compressed bitstream 420 of FIG. 4. For example, the process 900 can be performed in whole or in part by the entropy encoding stage 408 of the encoder 400. The process 900 can be performed by a decoder such as the decoder 500 of FIG. 5. When implemented by a decoder, coding means decoding from an encoded bitstream, such as the compressed bitstream 420 of FIG. 5. For example, the process 900 can be performed in whole or in part by the entropy decoding stage 502 of the decoder 500 and the encoded video bitstream can be the compressed bitstream 420 of FIG. 5.

Implementations of the process 900 can be performed by storing instructions in a memory such as the memory 204 of the receiving station 106 to be executed by a processor such as CPU 202, for example.

The process 900 can be implemented using specialized hardware or firmware. Some computing devices can have multiple memories, multiple processors, or both. The steps or operations of the process 900 can be distributed using different processors, memories, or both. For simplicity of explanation, the process 900 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 902, the process 900 codes an end-of-block indicator of the transform block. In an implementation, the scan position of the EOB can be coded. For example, and referring to FIG. 7, the scan position 11 corresponding to the last non-zero transform coefficient 708 can be coded. In another example, the scan position 12, corresponding to the coefficient following the last non-zero transform coefficient 708 in the forward scan order, is coded. In an implementation, the end-of-block indicator can be coded using a context model.

At 904, the process 900 codes the non-zero map in the backward scan order starting at the last non-zero coefficient of the transform block. The non-zero map indicates which transform coefficients of a transform block have a zero value and which transform coefficients of the transform block have a non-zero value. The process 900 codes the non-zero map that is similar to the non-zero map 706 of FIG. 7. The process 900 codes a binary value indicating whether a quantized transform coefficient at a scan position of the scan order is zero or non-zero. For example, for a scan position i, the process 900 can code a zero if the quantized transform coefficient at the scan position i is zero; otherwise a 1 is coded.

At 906, the process 900 codes a respective lower-range level map having a respective map level up to a maximum level T. A lower-range level map having to a map level indicates the transform coefficients of the transform block are equal, in absolute value, to the respective map level and which transform coefficients of the transform block are, in absolute value, greater than the respective map level. When implemented by a decoder, the process 900 decodes values from the encoded video bitstream to reconstruct lower-range level-k maps encoded as described with respect to 604 of the process 600.

For example, to reconstruct a level-1 map, the process 900 starts from the highest non-zero transform coefficient traversing backwards to determine which of transform coefficients are equal to 1 and which are greater than 1. That is, using the reconstructed non-zero map of the non-zero map 706 of FIG. 7, and starting at the last non-zero coefficient 710 and traversing backwards to the value 740, the process 900 reconstructs the level-1 map 707 of FIG. 7. For each 1 value of the reconstructed non-zero map, the process 900 decodes a value from the encoded video bitstream and reconstructs the level-1 map 707. The values decoded by the process 900 are zero and one (1) values.

To reconstruct a level-2 map, the process 900 uses the same procedure as that used to generate the level-1 map except that, instead of traversing the reconstructed non-zero map, the process 900 uses the reconstructed level-1 map. The process 900 repeats all the steps until the maximum level number of level maps are reconstructed.

In an implementation, the maximum level T can be provided to the process 900 via a configuration. In another implementation, the maximum level T can be signaled, by an encoder, in the encoded video bitstream. As such, the process 900 decodes the maximum level T from the encoded video bitstream.

At 908, the process 900 codes a coefficient residual map. Each residual coefficient of the coefficient residual map corresponds to a respective transform coefficient of the transform block having an absolute value that exceeds the maximum level. When implemented by a decoder, the process 900 reconstructs, e.g., the coefficient residual map 734 of FIG. 7. For each one (1) value of the level-T map, the process 900 decodes a corresponding residual value from the encoded bitstream to reconstruct the coefficient residual map 734 of FIG. 7.

In some implementations, the process 900 can include coding a sign map, at 910. The sign map can be a sign map such as described with respect to the sign map 732 of FIG. 7. The sign map indicates which transform coefficients of the transform block have positive values and which transform coefficients have negative values.

For a transform block of size N×N, in the worst case N×N−1 bins (binary symbols) may need to be context coded to determine the EOB position. For example, when N=32, in the worst cost, a total of 1023 bins may be context coded (i.e., coded using a context model) to determine the EOB position.

Some implementations can use scan positions groups to reduce the number of context-coded bins required to code the EOB position. As such, coding the scan position corresponding to the end-of-block position can include coding an index of a scan positions group that includes the scan position and coding an offset within the scan positions group, the offset corresponding to a position of the scan position within the scan positions group.

In an implementation of level maps, the value EOB=0 can be reserved for indicate that all transform coefficients of the block are zero. That is, when EOB=0, then the block is an all-zero block.

In an example of such implementations, the scan positions can be partitioned (e.g., grouped) into 11 scan positions groups: 1, 2, [3, 4], [5-8], [9-16], [17-32], [33-64], [65-128], [129-256], [257-512], [513-1024]. That is, the group with index 0 includes only the scan position 1; the group with index 1 includes only the scan position 2; the group with index 4 includes the scan positions 9-16; and so on. For example, assuming that the scan position 50, corresponding to the EOB, is to be coded, then the index 6 of a scan positions group [33-64] that includes the scan position 50 is coded and the offset 17 (i.e., 50-33=17) within the scan positions group [33-64] is coded.

In an implementation, the index of the group that includes the coded scan position corresponding to the end-of-block is context-coded (i.e., is coded using arithmetic coding using a context model) and the offset within the scan positions group can be coded in by-pass mode. By-pass mode, which may also be referred to as the literal mode, means that the value to be coded is not coded using a context model. The by-pass mode can be used, for example, when the offset values within a range are equally probable. To code the offset 17, five (5) bits are required. As such, in this example, the number of context coded bins for EOB is at most 10 corresponding to the group indexes {0, 1, . . . , 10}.

In an implementation, the index of the group that includes the coded scan position corresponding to the end-of-block is context-coded (i.e., coded using a context model) and at least some of the most significant bits of the offset within the scan positions group can also be context-coded. That is, the offset value can be considered to include prefix bits (i.e. most significant bits) and suffix bits (i.e., least significant bits). The prefix bits can be context-coded and the suffix bits can be coded using by-pass mode. Any number of bits of the offset value can be considered the most significant bits. For example, the offset value 17 corresponds to the binary string 10001. If the first 2 bits are considered most significant, then the bits 10 are context-coded and the bits 001 are by-pass coded (i.e., coded using by-pass mode). If the first 3 bits are considered most significant, then the bits 100 are context-coded and the bits 01 are by-pass coded.

The scan positions can be grouped into scan position groups in any number of ways. In an implementation, and as illustrated by the above group, each group can include a power of 2 number of scan positions. The power of 2 can be the index scan position groups minus 1 (i.e., index −1). For example, the scan position groups at index 5 (i.e., the group [17-32]) includes $2^{5-1}$ ($=2^4=16$) scan positions. As such, to code an offset within a scan position groups having an index inx, only (inx−1) bits are required. For example, one (1) bit is required to code an offset in the group having index 2 (the group [3,4]), two (2) bits are required to code an offset in the group having index 3 (the group [9-16]), and so on.

In an implementation, the number of scan positions in each scan positions group can be limited to a maximum predetermined number (i.e., a ceiling). For example, the group size can be limited to no greater than 16. As such, the above group can be modified as follows: 1, 2, [3, 4], [5-8], [9-16], [17-32], [33-48], [49-64], . . . , [1009-1024]. As such, coding an offset requires no more than 4 bits. To code an EOB position of 50 using the modified groups, the index 7, which corresponds to the scan positions group [49-64], can be coded using arithmetic coding with context models. The offset 1 (=50-49) can be coded in bypass mode by using 4 bits, namely 0001.

In some implementations, the value EOB=0 is not reserved for indicating that all transform coefficients of the block are zero. In such implementations, the scan positions groups can start at 0 and end at 1023, such as 0, 1, [2, 3], [4-7], [8-15], [16-31], [32-63], [64-127], [128-255], [256-511], [512-1023].

As described above, the values of the non-zero map 706 include binary values. The binary values indicate whether a transform coefficient at a given location of the transform block is zero or non-zero. As such, the values of the non-zero map can be considered non-zero flags. The binary values enable the use of sophisticated spatial neighboring templates for context modeling. Such spatial neighboring templates can better capture statistical characteristics of transform blocks, especially those with larger transform block sizes. Accordingly, the coding of non-zero flags (and thus, the coding of transform coefficients) can be improved by fully utilizing the information of neighboring non-zero flags when determining a context for selecting a context model.

A template captures the coded history of the non-zero flags (i.e., values of the non-zero map) that are coded before a current non-zero flag. A template can define (e.g., specify, select, set, or any way define), for a current scan position, the scan positions of the non-zero map values that are to be used for determining the context for coding the current value. Equivalently, a template can be defined in terms of the Cartesian coordinates, within the non-zero map, of the non-zero values to be used for determining the context.

Figure 10A:
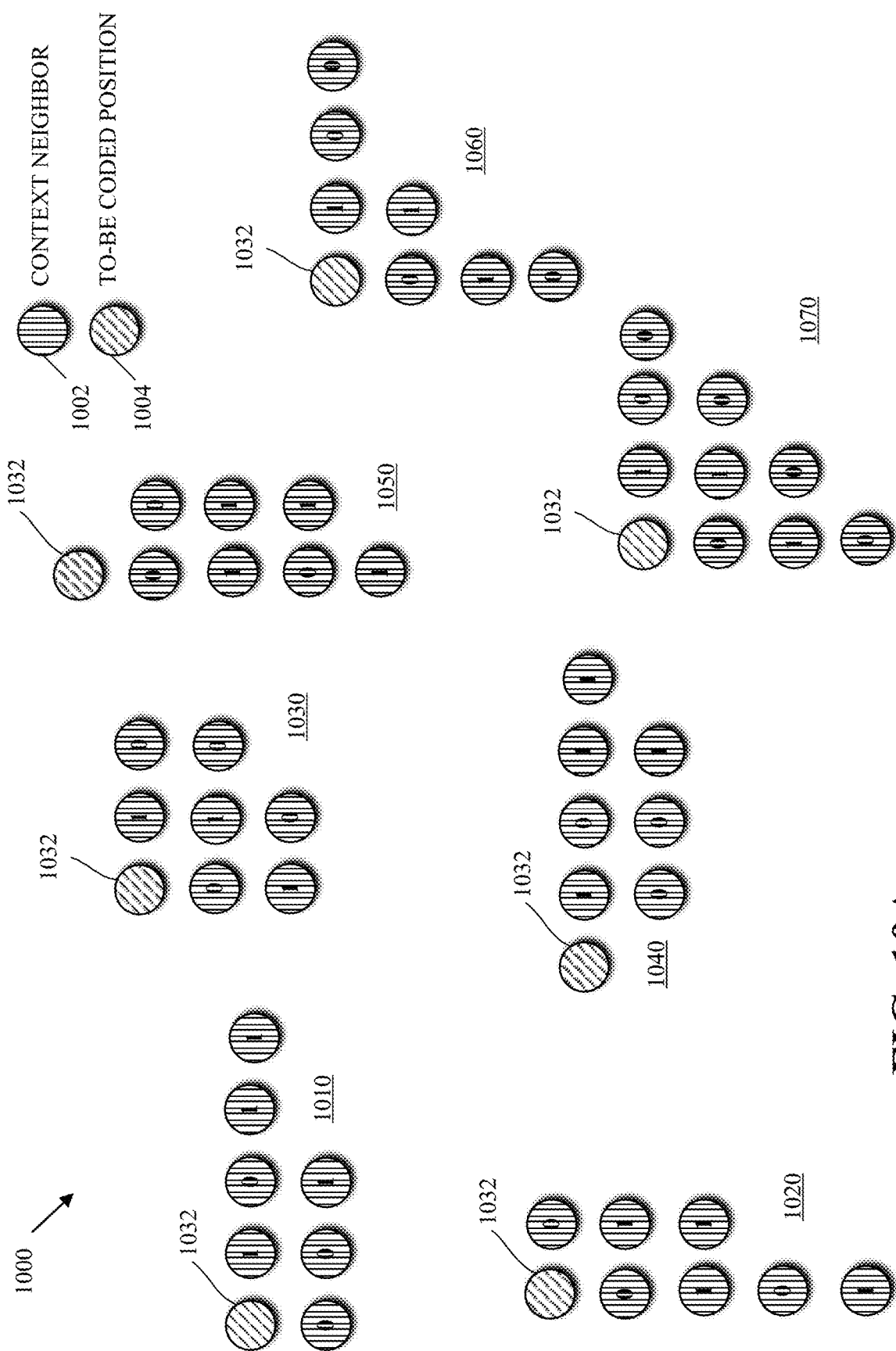
FIGS. 10A-B is a diagram of examples of templates for determining a coding context according to implementations of this disclosure.
Figure 10B:
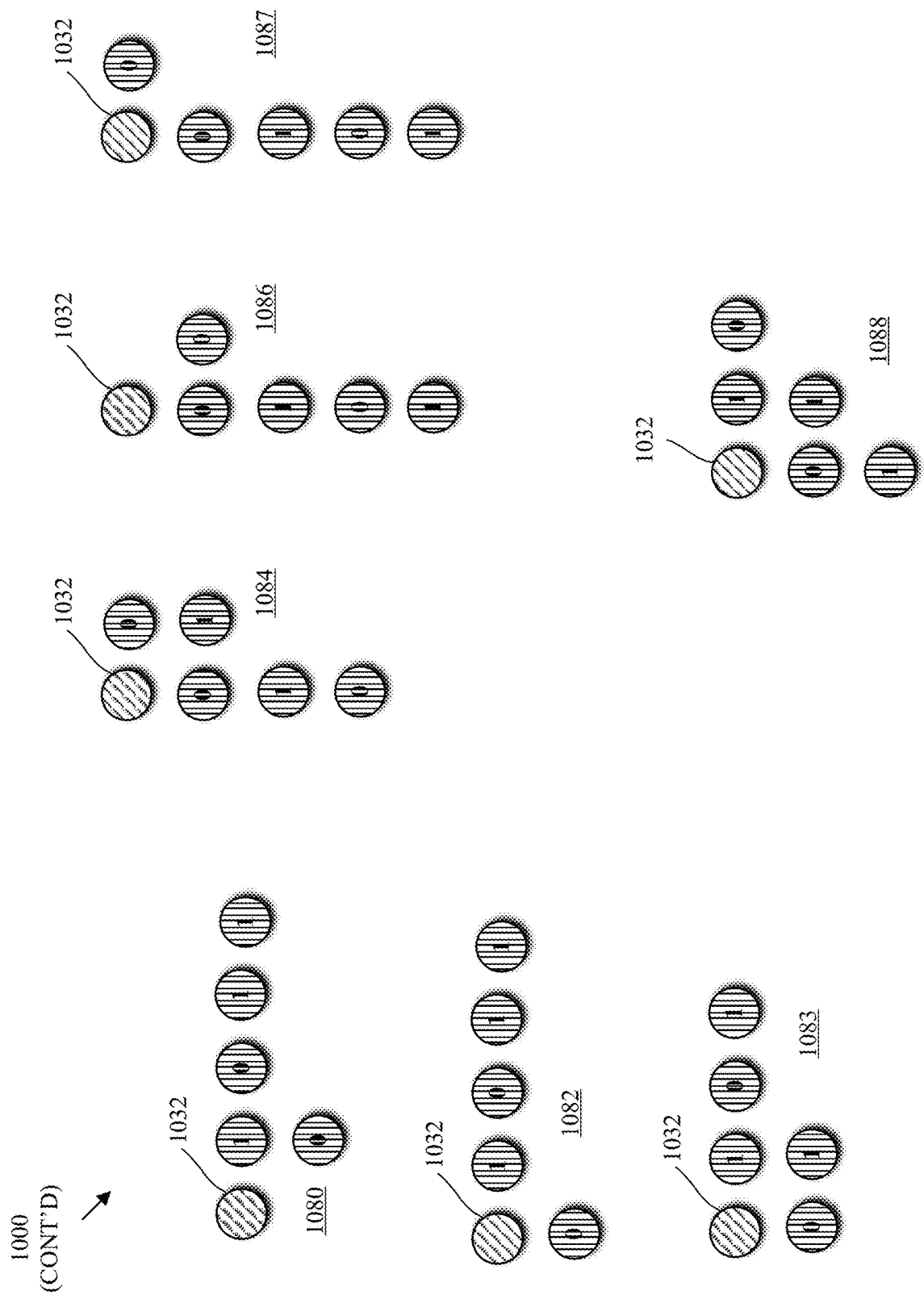

FIGS. 10A-10B is a diagram of examples 1000 of templates for determining a coding context according to implementations of this disclosure. In FIGS. 10A-10B, values (i.e., circles representing values of a non-zero map) shaded using the pattern 1004 are to-be-coded values; and the values shaded with the pattern 1002 are values for which context information are available because these values are coded before a to-be-coded value 1032. In the examples of FIGS. 10A-10B, the to-be-coded value 1032 depicts the current value of the non-zero map to be coded. The examples of FIGS. 10A-10B are non-limiting examples. Templates having other shapes and/or sizes are also possible.

In an example, the number of non-zero values corresponding to the template positions can be used as the context for coding the current value. For example, the values corresponding to the template positions can be added and the sum can be used as the context. In some cases, a template position may not be available, such as, for example, if the context position is outside the boundaries of the block. In an example, an unavailable value can be assumed to be zero (0). In another example, an unavailable value can be assumed to be one (1).

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, one-dimensional Discrete Sine Transform DST (1D DST) or its approximation, a two-dimensional DCT (2D DCT) or its approximation, two-dimensional DST (2D DST) or its approximation, and an identity transform. Other transform types can be available. In an example, a one-dimensional transform (1D DCT or 1D DST) can be applied in one dimension (e.g., row or column) and the identity transform applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

As indicated above with respect to FIG. 9, the non-zero map can be coded in the backward scan order starting at the last non-zero coefficient (i.e., starting at the highest AC transform coefficient) of the transform block. As such, the coded history of a current value (i.e., a current non-zero flag) of the non-zero map includes values that are to the right and below the current value in the two-dimensional non-zero map, such as the non-zero map 706.

When a 1D vertical transform type is applied, the to-be-coded value 1032 is more correlated with vertical neighbor values than with horizontal neighbor values. As such, a template 1010 can be used in the case a 1D transform (e.g., 1D DCT) is applied to columns Assuming that the to-be-coded value 1032 is at position (x, y) of the non-zero map, then the template 1010 comprises the values at the seven positions (x+1, y), (x+2, y), (x+3, y), (x+4, y), (x, y+1), (x+1, y+1), and (x+1, y+2).

When a 1D horizontal transform type is applied, the to-be-coded value 1032 is more correlated with horizontal neighbor values than with vertical neighbor values. As such, a template 1020 can be used in the case a 1D transform (e.g., 1D DCT) is applied to rows. Assuming that the to-be-coded value 1032 is at position (x, y) of the non-zero map, then the template 1020 comprises the values at the seven positions (x+1, y), (x, y+1), (x+1, y+1), (x, y+2), (x+1, y+2), (x, y+3), and (x, y+4).

When a 2D transform type (e.g., 2D DCT, 2D DST) is applied, a template 1030 can be used. Assuming that the to-be-coded value 1032 is at position (x, y) of the non-zero map, then the template 1030 comprises the values at the seven positions (x+1, y), (x+2, y), (x, y+1), (x+1, y+1), (x+2, y+1), (x, y+2), and (x+1, y+2).

In some examples of templates, the non-zero value that is scanned immediately before the to-be-coded value 1032 is not included in the template. That is, if the to-be-coded value 1032 is at scan position i, then the non-zero value at scan position (i−1) is not included in the template. Even though the non-zero map is coded in a backward scan order, the scan order of the scan order can depend on the transform type. The scan order of the backward scan order is the order in which non-zero values of the non-zero map are visited from the highest AC value to the DC value. In an example, a vertical scan order can be used when a 1D horizontal transform type is used. As such, the scan order proceeds in column-wise order (e.g., from bottom to top). In an example, a horizontal scan order can be used when a 1D vertical transform type is used. As such, the scan order proceeds in row-wise order (e.g., from right to left).

Template 1040 is another example of a template that can be used when a 1D-transform type is applied to columns. In the template 1040, the non-zero value that is scanned immediately before the to-be-coded value 1032 is not included in the template. Assuming that the to-be-coded value 1032 is at position (x, y) of the non-zero map, then the template 1040 comprises the values at the seven positions (x+1, y), (x+2, y), (x+3, y), (x+4, y), (x+1, y+1), (x+1, y+1), and (x+1, y+2).

Template 1050 is another example of a template that can be used when a 1D-transform type is applied to rows. In the template 1050, the non-zero value that is scanned immediately before the to-be-coded value 1032 is not included in the template. Assuming that the to-be-coded value 1032 is at position (x, y) of the non-zero map, then the template 1040 comprises the values at the seven positions (x, y+1), (x+1, y+1), (x, y+2), (x+1, y+2), (x, y+3), (x+1, y+3), and (x, y+4).

Template 1060 is an example of a template that can be used when a 2D transform (e.g., 2D DCT, 2D DST) is used. Assuming that the to-be-coded value 1032 is at position (x, y) of the non-zero map, then the template 1040 comprises the values at the seven positions (x+1, y), (x+2, y), (x+3, y), (x, y+1), (x+1, y+1), (x, y+2), and (x, y+3).

Each of templates 1010-1060 includes seven (7) positions. However, a template can include more or less positions and/or can have other shapes. For example, template 1070 is another example of a template that can be used when a 2D transform type is used. The template 1070 includes eight (8) positions. Assuming that the to-be-coded value 1032 is at position (x, y) of the non-zero map, then the template 1040 comprises the values at the eight positions (x+1, y), (x+2, y), (x+3, y), (x, y+1), (x+1, y+1), (x, y+2), (x+1, y+2), and (x, y+3).

In other examples, a template can include five (5) positions. For example, a template 1088 of FIG. 10B, which includes the positions (x+1, y), (x, y+1), (x+2, y), (x, y+2), (x+1, y+1), can be used for 2D-transform types. For example, templates 1080, 1082, 1083 can be used for a vertical 1D-transform type. The template 1080 includes the positions (x+1, y), (x+2, y), (x+3, y), (x+4, y), and (x, y+1). The template 1082 includes the positions (x+1, y), (x+2, y), (x+3, y), (x+4, y), and (x+1, y+1). The template 1083 includes the positions (x, y+1), (x, y+2), (x, y+3), (x+1, y), (x+1, y+1). For example, templates 1084, 1086, and 1087 can be used for a horizontal 1D-transform type. The template 1084 includes the positions (x+1, y), (x+2, y), (x+3, y), (x, y+1), (x+1, y+1). The template 1086 includes the positions (x, y+1), (x, y+2), (x, y+3), (x, y+4), and (x+1, y+1). The template 1087 includes the positions (x, y+1), (x, y+2), (x, y+3), (x, y+4), and (x+1, y). In some implementation, the positions (x+1, y) and (x, y+1) can be replaced by the positions (x+1, y+2) and (x+2, y+1), respectively.

In some implementations, coding of a level-k map, where k>0, can also use different templates (e.g., templates as described above) depending upon transform types. For example, as described above, one template may be used for 2D-transform type, one template may be used for vertical 1D-transform type, and another template may be used for horizontal 1D-transform type.

In some implementations, the contexts used to code the non-zero flags can depend upon the locations (i.e., the scan positions or the block positions) of the non-zero flags. As such, in some implementations, the transform-type-dependent templates, described above, can be combined with the locations of the non-zero flags to determine a context. To avoid using too many contexts, which may lead to the so-called context dilution problem, the locations can be classified into regions. For example, the classification may be dependent upon the transform type.

As described above with respect to FIG. 7, the level maps are coded sequentially. That is, the non-zero map 706 is coded, then the level-1 map is coded, then the level-2 map is coded, and then the coefficient residual map 734 is coded. However, in some implementations, a different coding structure can be used.

As described above with respect to FIGS. 10A-10B, coding of a level-k map, where k>0, can also use different templates (e.g., templates as described above) depending upon transform types. That is, a template, as described above can be used to determine a context for coding whether a coefficient at (x, y) is greater than 1 (e.g., using a corresponding value of a level-1 map, such as the level-1 map 707 of FIG. 7) or is greater than 2 (e.g., using a corresponding value of a level-2 map, such as the level-2 map 709 of FIG. 7).

As such, each coefficient can be coded up to whether the coefficient is greater than the maximum level. In the example of FIG. 7, the maximum level is 2. As such, each coefficient can be coded up to whether the coefficient is greater than 2 (using corresponding values of level maps) before proceeding to coding of a next coefficient. In an implementation, a coefficient value that is greater than 2 (i.e., a coefficient value that is greater than the maximum level) can be represented by the value 3 (i.e., the maximum level+1). As such, coding a coefficient "up to whether the coefficient is greater than maximum level (e.g., 2)" (i.e., coding an "up-to" value) can mean coding a value 0, 1, 2, . . . , (maximum level+1) (e.g. 3) corresponding, respectively and in the case what the maximum level is 2, to a coefficient having a value equal to 0, equal to 1, equal to 2, and greater than 2. For brevity, and as mentioned above, a value that results from coding a coefficient "up to whether the coefficient is greater than maximum level" is referred to herein as an "up-to" value.

The "up-to" values of the coefficients of the transform block can be referred to collectively as a "lower plane" or a first plane. The coefficient residual map, such as the coefficient residual map 734 of FIG. 7, is also referred to herein as the "higher plane" or second plane.

Figure 11:
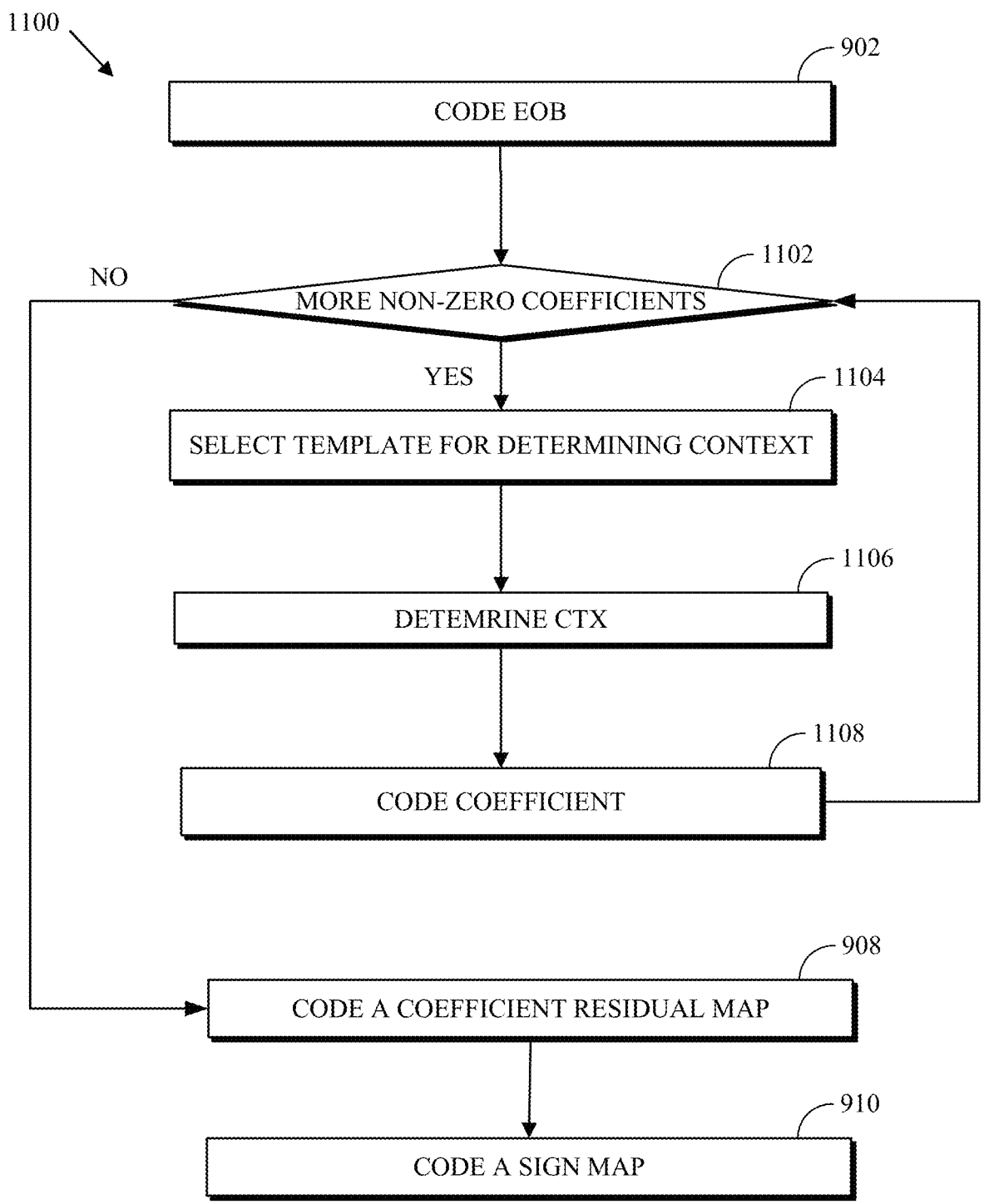
FIG. 11 is a flowchart diagram of a process for coding a transform block using level maps according to an implementation of this disclosure.

FIG. 11 is a flowchart diagram of a process 1100 for coding a transform block using level maps according to an implementation of this disclosure. Unlike the process 900 which codes the level maps sequentially (i.e., each map is coded before proceeding to coding the next map), the process 1100 codes, for each non-zero coefficient, using a template, and in a case where the maximum level is 2 (i.e., T=2), whether the coefficient is 0, 1, 2, or greater than 2 (represented by the value 3). That is, the process 1100 codes the "up-to" value of the lower plane of a coefficient before proceeding to the next coefficient in the scan order. The process 1100 can include blocks similar to those of the process 900. Descriptions of the similar blocks (e.g., 902, 908, and 910) are omitted. Some implementations of the process 1100 can include the block 910 before the block 908.

The process 1100 can be implemented by an encoder such as the encoder 400 of FIG. 4. When implemented by an encoder, coding means encoding in an encoded bitstream, such as the compressed bitstream 420 of FIG. 4. For example, the process 1100 can be performed in whole or in part by the entropy encoding stage 408 of the encoder 400. The process 1100 can be performed by a decoder such as the decoder 500 of FIG. 5. When implemented by a decoder, coding means decoding from an encoded bitstream, such as the compressed bitstream 420 of FIG. 5. For example, the process 1100 can be performed in whole or in part by the entropy decoding stage 502 of the decoder 500 and the encoded video bitstream can be the compressed bitstream 420 of FIG. 5.

Implementations of the process 1100 can be performed by storing instructions in a memory such as the memory 204 of the receiving station 106 to be executed by a processor such as CPU 202, for example.

The process 1100 can be implemented using specialized hardware or firmware. Some computing devices can have multiple memories, multiple processors, or both. The steps or operations of the process 1100 can be distributed using different processors, memories, or both. For simplicity of explanation, the process 1100 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1102, the process 1100 determines whether there are more non-zero coefficients to code. If so, the process 1100 proceeds to 1104 to code a current quantized transform coefficient at (x, y); otherwise, the process 1100 proceeds to 908 followed by 910. At 1104, the process 1100 selects a template for coding a current quantized transform coefficient. As used in this disclosure, "select" means to identify, construct, determine, specify, generate, or other select in any manner whatsoever. The template can be a template as described with respect to FIGS. 10A-10B. In an example, the same template is used for coding all the coefficients of the transform block. As such, the template can be selected once for the process 1100 and be performed before the block 1102.

At 1106, the process 1100 determines a context using the template. The process 1100 can determine the context using the template in any number of ways. Each template position corresponds to a lower plane value (e.g., 0, 1, . . . , T+1). Combinations of the values can be used to determine the context. For example, a sum of the values can be used. For example, a weighted sum can be used to determine the context. The weight assigned to a position can be set based on the distance to an "origin." In an example, the origin can be the location (x, y) of the current transform coefficient for which the context is being determined. Examples of distance include a scan position distance (e.g., a difference between the scan position of the current coefficient and a position of the template) or a Cartesian distance. However, other ways of setting the weight can be available. In yet another example, a non-linear function can be used. For examples, the maximum or minimum value in the template can be used for determining the context. In yet another example, the context can be determined using a combination of the sum and the maximum values. Other methods and/or values, or combinations of methods and/or values, can be used for determining the context from the template.

Using the sum (i.e., addition) of the values at the positions of the template to determine a context is now given. It should be understood that the following can be used with any method for determining the context using the template.

The process 1100 can add up (sums) the values corresponding to the positions of the template. When using a template for deriving a context for coding a coefficient, each of the positions of the template can have one of the values 0, 1, 2, or 3 (i.e., when T=2). As such, if the template includes N positions, then the maximum sum can be 3*N. For example, if a template that includes 5 positions is selected at 1104, then the maximum sum can be 15 (=3*5); if a template that includes 7 positions is selected, then the maximum sum can be 21 (=3*7).

In an implementation, where level maps as described with respect to FIG. 7 are used, to determine a value for a position of the template, the values, at the same positions in the non-zero maps and the level-k maps can be added or counted. For example, assuming that the position of the last non-zero transform coefficient 708 is a position of the template, then the value of the template at that position can be determined to be the sum of the values at 710 (i.e., 1) and 716 (i.e., 0) of the non-zero map 706 and level-1 map 707. As such, the value is 1. As another, assuming that the position of the transform coefficient 739 is a position of the template, then the value of the template at that position can be determined to be the sum of the values at the corresponding locations of in the non-zero map 706, the level-1 map 707, and the level-2 map 709. As such, the value is 3. As such, the context index can be determined using a sum of the values corresponding to positions of the template where each value of the template is determined by summing respective values of at least some of the level maps.

In another implementation, the level maps, including the zero map and as described with respect to FIG. 7 are not generated. Instead, a lower plane one-dimensional array, level, can be used to indicate whether a transform coefficient is one of 0, 1, ..., T+1. Whereas the lower plane mentioned above is a 2-dimensional structure corresponding to the transform block, the lower plane one-dimensional array, level, is generated as a result of the scan order. The lower plane one-dimensional array, level, is referred to as the lower-plane array.

Given a scan position i, level[i]={0, 1, ..., T+1}. The lower plane array, level, can include values for all transform coefficients of the transform block. Alternatively, the lower plane array can include values for coefficients up to the end-of-block coefficient. That is, the lower plane array, level, can include values for each transform coefficient up to and including the last non-zero coefficient of the transform block.

In the case of an encoder, the lower plane array, level, can be generated a priori before coding its values in a bitstream. Alternatively, the lower plane array, level, can be generated as coefficients are encoded. For example, the lower plane array can be generated using the steps: 1) for a scan position, determine a corresponding "up-to" value, 2) code the "up-to" value, and 3) store/place the "up-to" at the scan position in the lower plane, level. The steps 2 and 3 can be reversed. In the case of a decoder, the lower plane array, level, can be populated with values as the values are decoded from the bitstream.

The sum for determining the context index can be calculated by adding the respective values of the lower plane array, level. For example, assuming that the template includes 5 positions corresponding to the scan positions $l_1$, $l_2$, $l_3$, $l_4$, and $l_5$, then the sum can be determined as sum=level[l1]+level[l2]+level[l3]+level[l4]+level[l5].

Using the sum, the process 1100 can determine a context index (e.g., a variable ctx). The context index can be determined using an operation that is similar to the operation ((counts+1)>>1) as described above. However, instead of using "count," a "sum" is used. As such, the process 1100 uses ((sum+1)>>1) for determining the context index.

The context index ctx may be out of range. For example, assuming that the sum is 15, the transform class is TX_CLASS_2D, and that (x, y) is (1, 2), then the context index is ((sum+1)>>1)+6=((15+1)>>1)+6=14. However, the number of available contexts for the TX_CLASS_2D, using the above example, is 11. As such, the context index is out of range. Equivalently, a sum that results in a context index that is out of range can itself be considered out of range. If the context index is out of the range, then, the process 1100 can set the context index to a predetermined number. As such, the process 1100 can determine the context index using a formula such as min(((sum+1)>>1), predetermined number). As such, the value ((sum+1)>>1) is upper-bounded by the predetermined number. In an example, the predetermined number can be 4. In an example, the predetermined number can depend on the transform class type. The predetermined number can be selected in any other ways.

The context index ctx can be used to select a context for coding the current transform coefficient; more specifically, to code the "up-to" value of the current transform coefficient. At 1108, the process 1100 codes the coefficient using the context.

An implementation of the process 1100 that uses the lower plane array, level, for coding transform coefficients of the transform block can be summarized using the following procedure:

```
1.     for (i=eob-1; i>=0; i--) {
2.         if (i < eob-1) code level[i]>0;
3.         if (level[i] > 0) {
4.             for (j=0; j<T; j++) {
5.                 code level[i] > j+1
6.                 if (level[i] == j+1)
7.                     break;
8.             }
9.         }
10.    }
11.    for (i==0; i < eob; i++) {
12.        if level[i] != 0
13.            code sign[i]
14.    }
15.    for (i=eob-1; i >= 0; i--)
16.        if level[i] > T
17.            code level[i]-T-1
```

The steps 1-10 can be repeated for each transform coefficient up to the last non-zero coefficient of the transform block. For a transform coefficient at scan position i, the steps 2-9 code the "up-to" value. That is, the steps 2-9 code "up to whether a transform coefficient of the transform block is greater than a maximum level of the level maps." For example, assuming that the maximum level T=2 and i<eob-1, if level[i]=3, then the steps 2-9 code the bits 111; if level[i]=0, then the steps 2-9 code the bit 0; and if level[i]=2, then the steps 2-9 code the bits 110. The steps 11-14 code the sign bits (e.g., the values of the sign map 732 of FIG. 7) of the non-zero transform coefficients up to the last non-zero coefficient. The steps 15-17 code, for each non-zero coefficient that is greater than the maximum level T (i.e., level[i]>T), a residual for the transform coefficient. That is, the steps 15-17 code a value from the higher plane. The values of the residuals can be as described with respect to the coefficient residual map 734.

Blocks 1102-1108 of FIG. 11 correspond to coding the lower plane and block 908 corresponds to coding the higher plane described above.

Using the coding structure described in FIG. 11 for coding a transform coefficient (i.e., a quantized transform coefficient), as compared to the coding structure described with respect to FIG. 9, better throughput can be obtained. Better throughput can mean that a transform block can be decoded faster using the coding structure of the process 1100 than that of the process 900.

Figure 12:
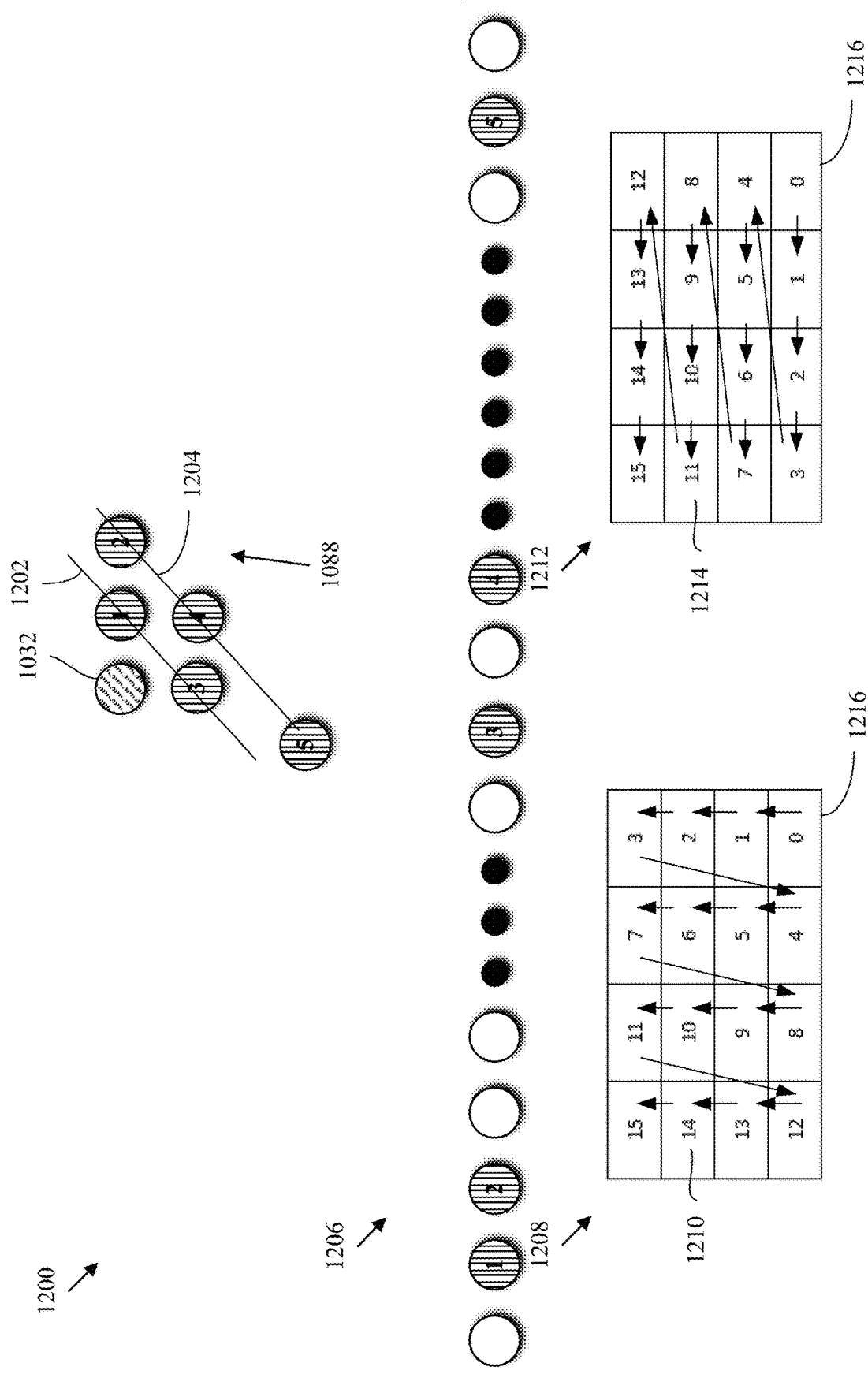
FIG. 12 is an example of an illustration of using a template do determine a context according to implementations of this disclosure.

FIG. 12 is an example of an illustration 1200 of using a template do determine a context according to implementations of this disclosure. The illustration 1200 uses a template, as described with respect to FIGS. 10A-10B, to determine a context index for a to-be-coded value 1032. The template used in the illustration 1200 is the template 1088 of FIG. 10B. However, other templates, such as the template 1070, can be used. The to-be-coded value can be the to-be-coded value 1032 of FIGS. 10A-10B. In FIG. 10B, the neighbors of the to-be-coded value 1032 are shown as having actual values. In FIG. 12, the neighbors of the to-be-coded value 1032 are numbers (i.e., 1-5) for ease of reference.

As described with respect to FIG. 11, coding proceeds in a backward scan order and the lower plane array, level, can be created. In the case of an encoder, "coding" means encoding, and a "to-be-coded" value means a value that is to be added to a compressed bitstream, such as the compressed bitstream 420 of FIG. 4. In the case of a decoder, "coding" means decoding, and a "to-be-coded" value means a value that is to be read from, or decoded from, a compressed bitstream, such as the compressed bitstream 420 of FIG. 5. The values of the lower plane array, level, are arranged according to the scan order.

The scan order determines a mapping from scan order positions (i.e., locations) of the one-dimensional lower plane array, level, to Cartesian locations of the transform block, or the lower plane; equivalently, the scan order determines a mapping from the Cartesian locations to scan order positions.

As described above, the template indicates, for a to-be-coded value of the lower plane, the scan positions of coded levels of the lower plane. Equivalently, as there is a one-to-one correspondence between scan positions and Cartesian coordinates for a given scan order, the template can indicate Cartesian coordinates. The coordinates can be absolute coordinates, using the DC coefficient as the origin. Alternatively, the coordinates can be relative coordinates (e.g., defined as vertical and horizontal offsets from the to-be-coded value). The neighbors specified by the template are arranged along template anti-diagonal lines. For example, and referring again to the template 1088 of FIG. 12, neighbors 1 and 3 are arranged along a template anti-diagonal line 1202; and the neighbors 2, 4, and 5 are arranged along a template anti-diagonal line 1204. As such, and depending on the number of neighboring locations of the template, the scan positions indicated by the template are arranged, in the template, in at least two template anti-diagonal lines. For example, while the scan positions indicated by the template 1088 are arranged along two template anti-diagonal lines, the scan positions indicated by the template 1070 of FIG. 10A are arranged along three template anti-diagonal lines.

An illustration of using the template 1088 with different scan orders is now given. The illustration uses a 4×4 block; however, the disclosure is not limited to any block size. Using a backward vertical scan order 1208 to process a 4×4 lower plane 1216, the value of the one-dimensional lower plane at a scan position 1210 (i.e., the scan position 14 in the scan order) corresponds to the lower plane value that corresponds to the transform coefficient at Cartesian location (1, 0) of the transform block. Assuming that the scan position 1210 is the to-be-coded value 1032, and superimposing the template 1088 on the backward vertical scan order 1208, then the neighboring locations 1-5 of the template 1088 correspond, respectively, to the scan positions 10, 6, 13, 9, and 12. Sorted in ascending order, the neighboring scan positions are 6, 9, 10, 12, and 13. As can be seen, the scan positions are not contiguous. That is, the scan positions are not sequential.

As another example, using the backward horizontal scan order 1212, the same Cartesian location (1, 0) corresponds to a scan position 11 (the scan position 11 in the scan order). Assuming that the scan position 1214 is the to-be-coded value 1032, and superimposing the template 1088 on the backward horizontal scan order 1212, then the neighboring locations 1-5 of the template 1088 correspond, respectively, to the scan positions 10, 9, 7, 6, and 3. Sorted in ascending order, the neighboring scan positions are 3, 6, 7, 9, and 10. Again, the scan positions of the neighboring locations are not contiguous (i.e., sequential).

Lower plane array 1206 illustrates a hypothetical ordering of values of a lower plane (not shown) according to a hypothetical scan order. As can be seen in the lower plane array 1206, the example of the backward vertical scan order 1208, and the example of the backward horizontal scan order 1212, the neighboring values 1-5 of the to-be-coded value 1032 using the template 1088 are located sparsely (i.e., non-contiguously) in the 1-dimensional lower plane array, level. As such, deriving a context model using the five neighbors of the template 1088 requires accessing sparse points in the 1-dimensional array.

It is noted that for nearly all computing platforms, including x86, ARM, and hardware-implemented codecs, the 2-dimensional array transform coefficient is stored in 1-D array (also referred to as line buffer). Lower plane arrays can also stored in line buffers. As accessing non-continuous (i.e., non-contiguous) data from line buffers downgrades data caching performance, using scan orders and/or techniques whereby neighboring values are located contiguously in line buffers can improve coding performance.

Figure 13:
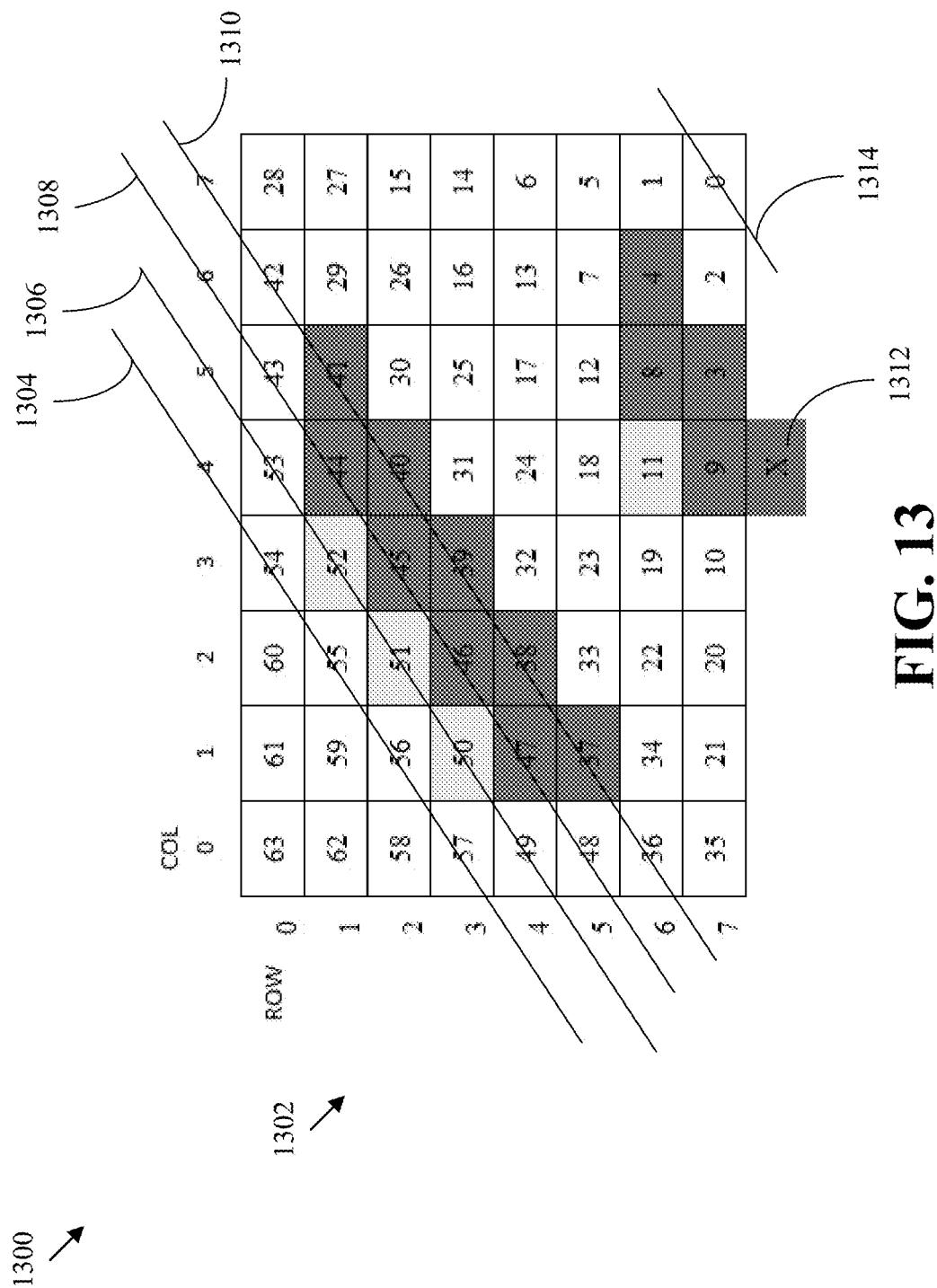
FIG. 13 is a diagram of an example of a scan order that aligns value along anti-diagonal lines according the implementations of this disclosure.

FIG. 13 is a diagram of an example 1300 of a scan order that aligns values along anti-diagonal lines according the implementations of this disclosure. The example 1300 includes a block 1302. The block 1302 can be a transform block from which lower plane values can be determined. That is, a lower plane block is not generated, rather the values of the lower plane block are inferred from the transform coefficients. Alternative, the block 1302 can represent a lower plane. That is, the lower plane can be generated and stored in memory from the transform coefficients. For simplicity of explanation, the block 1302 is assumed to be the 2-dimensional lower plane.

The block 1302 is shown as an 8×8 block. However, this disclosure is not limited to any particular block size. As indicated above, the lower plane would include, at a Cartesian location, a value for a transform coefficient at the same Cartesian location of the transform block. However, for illustration purposes, the cells of the block 1302 show the scan position of the respective cell, instead of the particular value at that cell. As indicated above, a lower plane, such as the block 1302 can be generated as values an encoded in a bitstream. Accordingly, the block 1302 may not be fully populated with values. For example, if a current scan position is x, then the block 1302 may only include values for scan positions lower than (or lower than and including) scan position x.

The scan order of the example 1300 can be referred to as an anti-diagonally aligned scan order. Using the anti-diagonally aligned scan order, a codec can advantageously process (to determine context indexes) all values in one scan-order anti-diagonal line using efficient parallel computing thereby improving cache performance.

Four scan-order anti-diagonal lines are indicated in the example 1300. A scan-order anti-diagonal line 1304 includes the scan positions 54-57; a scan-order anti-diagonal line 1306 includes the scan positions 49-53; a scan-order anti-diagonal line 1308 includes the scan positions 43-48; and a scan-order anti-diagonal line 1310 includes the scan positions 36-42.

Each scan-order anti-diagonal line is a line such that levels in the block 1302 having the same value col+row are considered to be on the same scan-order anti-diagonal line. For example, the scan-order anti-diagonal line 1304 includes those values having col+row=3. As such, the scan-order anti-diagonal line 1304 includes the values corresponding to the scan position 54 (corresponding to the value at block 1302 location (0, 3)), the scan position 55 (corresponding to the value at block 1302 location (1, 2)), the scan position 56

(corresponding to the value at block 1302 location (2, 1)), and the scan position 57 (corresponding to the value at block 1302 location (3, 0)).

As mentioned above, a template of neighboring positions can be used for determining a context for coding a value at a specific scan position of the block 1302. The template 1088 of FIG. 10B is again used for illustration purposes. As also mentioned above, any combination of the values of the neighboring positions can be used to determine a context index (i.e., ctx) that is used to select a context model. For illustration purposes, the sum combination (i.e., addition) is used herein.

Super-imposing the template 1088 on each of the scan positions of the scan-order anti-diagonal line 1306 indicates that the template anti-diagonal line 1202 of FIG. 12 coincides with the scan-order anti-diagonal line 1308 and the template anti-diagonal line 1204 of FIG. 12 coincides with the scan-order anti-diagonal line 1310. As such, coding values (e.g., of the scan positions 49-53) of a current scan-order anti-diagonal line (e.g., the scan-order anti-diagonal line 1306) uses the values of a first scan-order anti-diagonal line (e.g., the scan-order anti-diagonal line 1308) coded immediately before the current scan-order anti-diagonal line and the values of a second scan-order anti-diagonal line (e.g., the scan-order anti-diagonal line 1310) coded immediately before the first scan-order anti-diagonal line. The scan-order anti-diagonal line 1310 is said to be "older" than the scan-order anti-diagonal line 1308 since its values are coded first.

In the following, the notation $\tilde{X}$ (i.e., a number with a tilde on top) means "the value of the lower plane at scan location X). For example, $\tilde{31}$ means the value of the lower plane (i.e., the block 1302) at scan location 31. That is, and referring to the lower plane array, level, of FIG. 11, level [31]=$\tilde{31}$. Additionally, the notation O(X) refers to the context index of the context to be used for coding the value at scan position x. O(X) is calculated using the neighboring values identified in the template using an operation, such as an addition operation.

Referring to the block 1302, the context indexes of the contexts for coding the values at scan location 50, 51, and 52 are, respectively O(50)=$\tilde{37}$ + $\tilde{47}$ + $\tilde{38}$ + $\tilde{46}$ + $\tilde{39}$, O(51)=$\tilde{38}$ + $\tilde{46}$ + $\tilde{39}$ + $\tilde{45}$ + $\tilde{40}$, and O(52)=$\tilde{39}$ + $\tilde{45}$ + $\tilde{40}$ + $\tilde{44}$ + $\tilde{41}$. If a value is not available, as indicated above with respect to FIGS. 10A-10B, it can be assumed to be zero. As such, the context index of the context for coding the value at scan location 11 is O(11)=0+$\tilde{9}$+$\tilde{3}$+$\tilde{8}$+$\tilde{4}$ since scan location 1312 is not available (i.e., the scan location 1312 is outside the bounds of the transform block of the block 1302).

As can be seen from O(5), O(51) and O(52), the values used for determining the context models of two consecutive positions in a scan-order anti-diagonal line overlap. For example, one value (e.g., $\tilde{46}$) from the scan-order anti-diagonal line 1308 and two values (e.g., $\tilde{38}$ and $\tilde{39}$) from the scan-order anti-diagonal line 1310 are re-used for determining the context indexes O(50) and O(51); and one value (e.g., $\tilde{45}$) from the scan-order anti-diagonal line 1308 and two values (e.g., $\tilde{39}$ and $\tilde{40}$) from the scan-order anti-diagonal line 1310 are re-used for determining the context indexes O(51) and O(52). This pattern is repeated for all values of a scan-order diagonal line.

To reiterate, two consecutive scan positions (e.g., scan positions 50 and 51) along the same scan-order anti-diagonal line (e.g., the scan-order anti-diagonal line 1306) share previously coded values (e.g., $\tilde{39}$, $\tilde{45}$, and $\tilde{40}$) for calculating context indexes. The shared values are along previously coded scan-order anti-diagonal lines (e.g., the scan-order anti-diagonal lines 1308, 1310) corresponding to the template anti-diagonal lines (e.g., the template anti-diagonal lines 1202, 1204).

Additionally, it is noted that the values of each previously coded scan-order anti-diagonal line, which are required for coding a current to-be-coded value, are contiguous along the respective scan-order anti-diagonal line. For example, for determining the context index O(50), the required values $\tilde{46}$ and $\tilde{47}$ are contiguous along the scan-order anti-diagonal line 1308, and the required values $\tilde{37}$, $\tilde{38}$, and $\tilde{39}$ are contiguous along the scan-order anti-diagonal line 1310. Accordingly, by storing the values of each scan-order anti-diagonal line in a separate line buffer, determining a context index can be performed by accessing contiguous locations in each line buffer thereby improving coding performance.

The minimum number of line buffers depends on the number of template anti-diagonal lines. For example, as the template 1088 includes two template anti-diagonal lines (i.e., template anti-diagonal lines 1202, 1204), two line buffers need be maintained. For example, if the template 1070 of FIG. 10A is used, then three line buffers need be maintained.

For a transform block of size N×N, where M>N, each line buffer can include a maximum of N values. As such, for the block 1302 (which is of size 8×8), and using the template 1088, two line buffers each of size 8 can be used. Line buffer LB1 can correspond to the scan-order anti-diagonal line 1310. Line buffer LB2 can correspond to the scan-order anti-diagonal line 1308.

The total number of scan-order anti-diagonal lines for a lower plane of size N×N is 2N−1. For example, the block 1302 includes 2*8−1=15 scan-order anti-diagonal lines. In an implementation, each scan-order anti-diagonal line can have an index L, where L=0, 1, . . . , 2N−2. The number of values in a scan-order anti-diagonal line L, NUM(L), can be given by:

$$NUM(L) = \begin{cases} L+1 & \text{if } L < N \\ 2N-L-1 & \text{if } L \geq N \end{cases}$$

For example, a scan-order anti-diagonal 1314, with an index L=0 and, includes (L+1)=(0+1)=1 value. The scan-order anti-diagonal line 1310 has an index of L=8. Accordingly, the scan-order anti-diagonal line 1310 includes (2*8−8−1)=7 values.

As some of the scan-order anti-diagonal lines may not include N number of values, some locations of the corresponding line buffer can be assumed to be zero. The number of assumed-to-be-zero locations of the line buffer is equal to (N−NUM(L)). For example, as the scan-order anti-diagonal line 1308 has an index of L=9, a corresponding line includes 2 (i.e., 8−NUM(9)=8−(2*8−9−1)=8−6=2) assumed-to-be-zero locations.

In an implementation, the assumed-to-be-zero locations of a line buffer can be assumed to be at the head of the line buffer. In another implementation, the assumed-to-be-zero locations can be at the tail of the line buffer.

In an implementation, the values in the line buffers can be arranged with reference to an edge of the transform block. For example, the bottom edge can be used as the reference. That is, values of a scan-order anti-diagonal line that are closer to the reference edge (e.g., bottom edge) are stored toward the front of the life buffer. In such a case, if a scan-order anti-diagonal line visits locations from the top of the block towards the bottom of the block, then the scan locations of the scan-order anti-diagonal line are arranged, in the corresponding line buffer, in the reverse of the traversal order; and if a scan-order anti-diagonal line visits locations from the bottom of the block towards the top of the block, then the scan locations of the scan-order anti-diagonal line are arranged, in the corresponding line buffer, in the traversal order.

Accordingly, the line buffer LB1 can be arranged as LB1=[0, $\overline{36}$, $\overline{37}$, $\overline{38}$, $\overline{39}$, $\overline{40}$, $\overline{41}$, $\overline{42}$] and the line buffer LB2 can be arranged as LB2=[0, 0, $\overline{48}$, $\overline{47}$, $\overline{46}$, $\overline{45}$, $\overline{44}$, $\overline{43}$]. The values of the current scan-order anti-diagonal line can also be arranged in a line buffer, CURR_LB. Accordingly, a CURR_LB can be associated with the scan-order anti-diagonal line 1306. After coding all the values of the scan-order anti-diagonal line 1306, CURR_LB can be arranged as CURR_LB=[0, 0, 0, $\overline{49}$, $\overline{50}$, $\overline{51}$, $\overline{52}$, $\overline{53}$]. As such, the value at scan position x can be found at index y in CURR_LB. For example, the value at scan position 49 can be found at CURR_LB[3], the value at scan position 53 can be found at CURR_LB[7], and so on.

Calculating the context index O(x) of the context to be used for coding the value at scan position x where the scan position x corresponds to location y in the CURR_LB can be performed using the formula:

$$O(\text{CURR\_LB}[y]) = (\text{LB2}[y-1] + \text{LB2}[y]) + (\text{LB1}[y-2] + \text{LB1}[y-1] + \text{LB1}[y])$$

That is, determining the context index for a value at scan location y uses: 1) the values at scan positions (y−1) and (y) of the line buffer corresponding to the most recently coded scan-order anti-diagonal line and 2) the values at scan positions (y−2), (y−1), and (y) of the line buffer corresponding to the oldest coded scan-order anti-diagonal line. As such, only contiguous location in each line buffer are accessed. While one arrangement of values in line buffers and an indexing scheme are described, a person skilled in art can appreciate that other arrangements and indexing schemes are possible.

As indicated above, and when using the template 1088, the context model of a value of a scan-order anti-diagonal line depends on the previous two scan-order anti-diagonal lines. As such, caching data (i.e., values of the lower plane) for context reference modeling can be localized to two scan-order anti-diagonal lines, each of size N, rather than being scattered, for example, over the entire N×N transform block.

Figure 14:
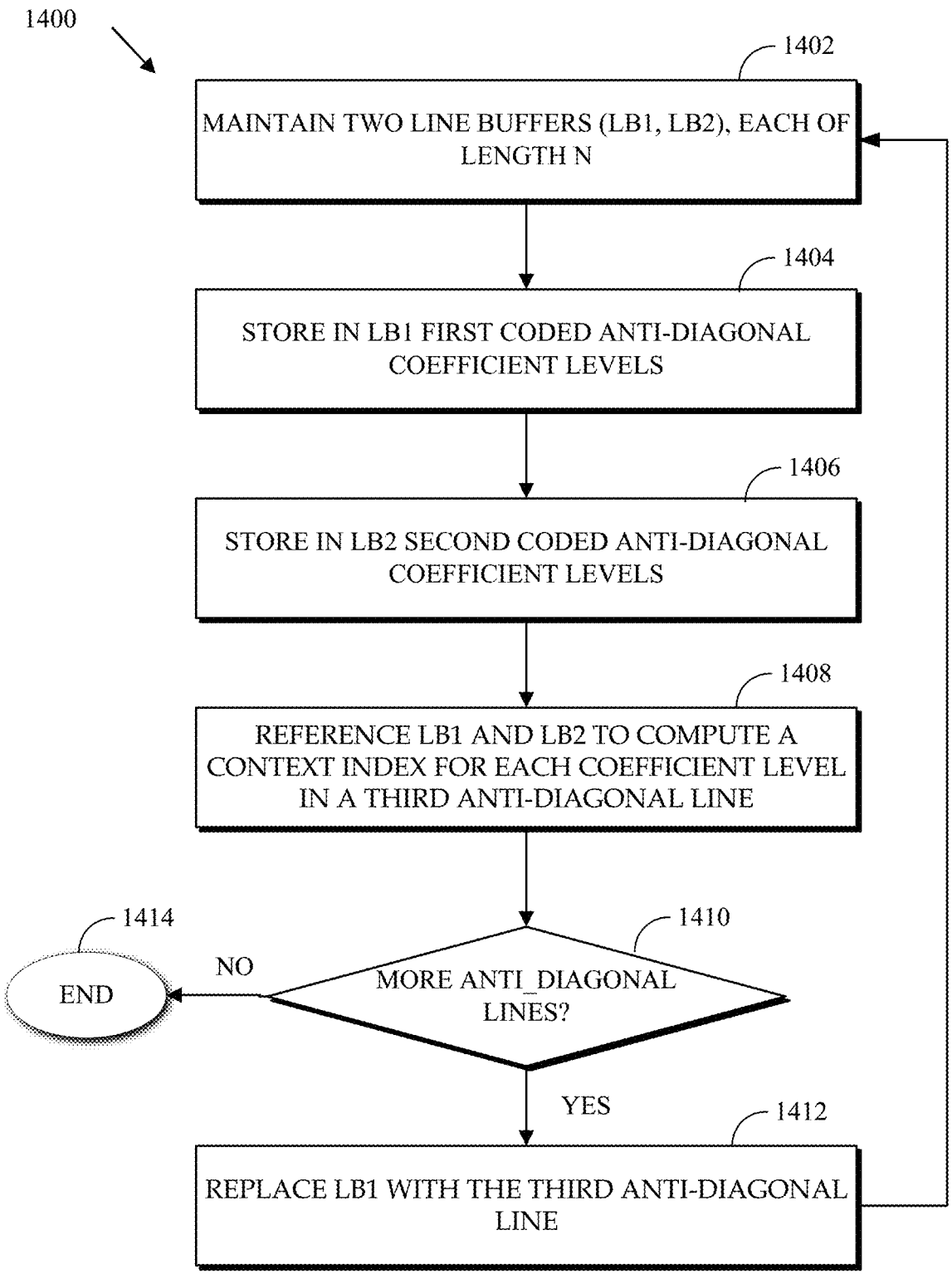
FIG. 14 is flowchart diagram of a process for cache management for context selection according to implementations of this disclosure.

FIG. 14 is flowchart diagram of a process 1400 for cache management for context selection according to implementations of this disclosure. The process 1400 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 1400. The process 1400 may be implemented in whole or in part in the entropy encoding stage 408 of the encoder 400 and/or entropy decoding stage 502 of the decoder 5001. The process 1400 can be implemented using specialized hardware or firmware. Multiple processors, memories, or both, may be used.

The process 1400 can be used when coding (i.e., encoding or decoding) a transform block. The transform block can be of size N×N. The process 1400 can be used with a transform block coding process that codes a transform block using a lower plane and a higher map. Specifically, the process 1400 can be used in the coding of the lower plane. The lower plane and the higher map can be as described above.

At 1402, the process 1400 maintains line buffers for scan-order anti-diagonal lines. Maintain can mean generate, calculate, store, determine, allocate, or maintain in any other way. The numbers of line buffers maintained by the process 1400 can depend on the number of template anti-diagonal lines. For example, the process 1400 can maintain, for each of the template anti-diagonal lines, a respective line buffer. For example, if the template used is a template such as the template 1088 of FIG. 10B, then the process 1400 can maintain two line buffers, LB1 and LB2 as described above. Each of the line buffers can be of size N. In describing the process 1400, the template 1088 is used. However, a template of different size or having more than two template anti-diagonal lines can be used.

At 1404, the process 1400 stores in LB1 first coded anti-diagonal coefficient levels. The anti-diagonal coefficient levels can be the values of the scan-order anti-diagonal line as described with respect to FIG. 13. For example, the process 1400 stores in LB1 the values of the scan-order anti-diagonal line 1310, as described above.

At 1406, the process 1400 stores in LB2 second coded anti-diagonal coefficient levels. For example, the process 1400 stores in LB2 the values of the scan-order anti-diagonal line 1308, as described above.

At 1408, the process 1400 references LB1 and LB2 to compute a context index for each coefficient level in a third anti-diagonal line. For example, the third anti-diagonal line can be the scan-order anti-diagonal line 1306. The process 1400 references LB1 and LB2 as described above. The first line buffer LB1 can correspond to the first scan-order anti-diagonal line (e.g., the scan-order anti-diagonal line 1310) that is farther than the second scan-order anti-diagonal line (e.g., the scan-order anti-diagonal line 1308) to the third anti-diagonal line (i.e., the current scan-order anti-diagonal line being coded, such as the scan-order anti-diagonal line 1306).

At 1410, the process 1400 determines whether there are more scan-order anti-diagonal lines to code. Alternatively, the process 1400, at 1410, determines whether there are mode lower plane values to code or transform coefficients to code. If so, the process 1400 proceeds to 1412; otherwise, the process 1400 ends at 1414.

At 1412, the process 1400 replaces LB1 with the third anti-diagonal line. When all the coefficient levels of the third anti-diagonal line are coded, the values stored in LB1 are no longer needed. That is, the values stored in LB1 are not used to determine a context index for coding any other value after the third anti-diagonal line is coded.

However, the values of the third anti-diagonal line and the values of the second anti-diagonal line are used in determining contexts for the next anti-diagonal line. For example, after coding the values of the scan-order anti-diagonal line 1306, a codec proceeds to code the values of the next scan-order anti-diagonal line, namely the scan-order anti-diagonal line 1304. In coding the values of the scan-order anti-diagonal line 1304, the values of the scan-order anti-diagonal lines 1306, 1308 are used. As such, the process 1400 retains LB2 and replaces LB1 with the scan-order anti-diagonal line 1306. That is, the process 1400 replaces the oldest-coded scan-order anti-diagonal line with the last coded scan-order anti-diagonal line.

The process 1400 repeats the above steps. However, in repeating the steps, LB1 and LB2 are interchanged. That is, before coding a new scan-order anti-diagonal line, the process 1400 replaces the oldest line buffer (the one of the LB1 and LB2 that was coded first) with the last coded (i.e., most recently coded) scan-order anti-diagonal line. The process 1400 repeats until all scan-order anti-diagonal lines of the lower plane are coded.

As described above with respect to O(50) and O(51), determining the context model for a positions in a scan-order anti-diagonal line overlaps with its nearest neighbors. A Implementations of this disclosure can leverage this repeated pattern to more efficiently calculate context indexes by using a moving window.

Figure 15:
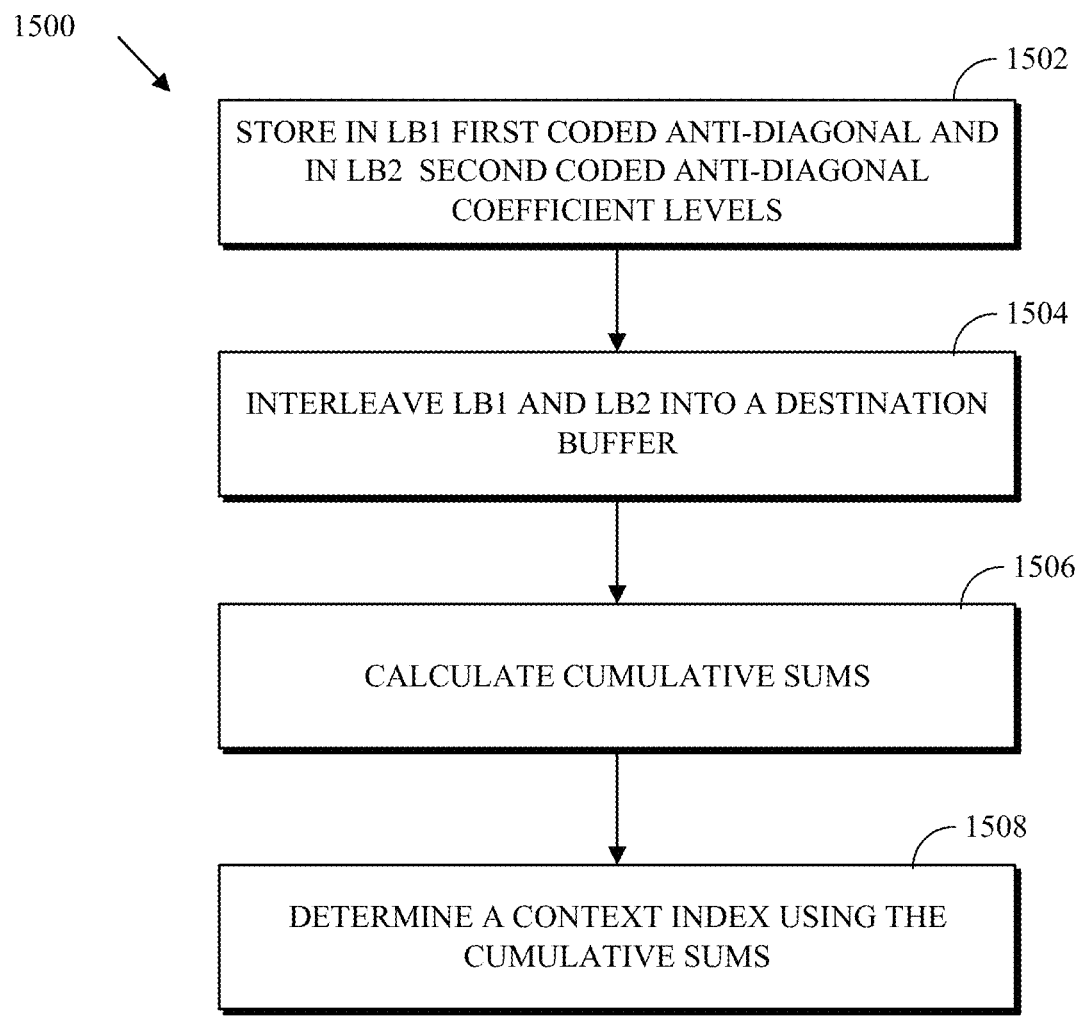
FIG. 15 is flowchart diagram of a process for using a moving window for context selection according to implementations of this disclosure.

FIG. 15 is a flowchart of a process 1500 for using a moving window for context selection according to implementations of this disclosure. The process 1500 can leverage the hardware capabilities of a codec to improve coding performance. The process 1500 interleaves the data of two line buffers into one destination buffer. The values of the destination buffer are used to implement the moving window as described with respect to cumulative sums.

At 1502, the process 1500 stores in a first line buffer, LB1, first coded anti-diagonal coefficient levels and stores in a second line buffer, LB2, second coded anti-diagonal coefficient levels. The line buffers LB1 and LB2 can be as described above with respect to the process 1400.

At 1504, the process 1500 interleaves the value of the first line buffer LB1 and the second line buffer LB2 into a destination buffer, DEST_BUF. For example, assuming that, as described above, LB1=[0, $\overline{36}$, $\overline{37}$, $\overline{38}$, $\overline{39}$, $\overline{40}$, $\overline{41}$, $\overline{42}$] and the LB2=[0, 0, $\overline{48}$, $\overline{47}$, $\overline{46}$, $\overline{45}$, $\overline{44}$, $\overline{43}$], then the destination buffer DEST_BUF=[0, 0, $\overline{36}$, 0, $\overline{37}$, $\overline{48}$, $\overline{38}$, $\overline{47}$, $\overline{39}$, $\overline{46}$, $\overline{40}$, $\overline{45}$, $\overline{41}$, $\overline{44}$, $\overline{42}$, $\overline{43}$]. More generally, if LB1=[B2, B4, B6, B8, . . . ] and LB2=[B1, B3, B5, B7, . . . ], then DEST_BUF=[B1, B2, B3, B4, B5, B6, B7, B8, . . . ].

Some hardware platforms, such as x86 and ARM, support direct interleave operation between two buffers (for example, via the operations unpacklo, unpackhi). Such operations can typically take two line buffers (e.g., LB1 and LB2) as input, interleave the data of the two lines buffers, and write the result into a destination buffer (e.g., DEST_BUF). As such, a codec implemented on such platforms, obtaining the DEST_BUF can be performed via the hardware instructions.

At 1506, the process 1500 calculates cumulative sums. In an implementation, the cumulative sums can be stored in a cumulative sums array, CUM_SUM. The cumulative sums are obtained over the destination buffer. The number of cumulative sums can be equal the total number of values in the destination buffer plus 1. The first cumulative sum value is zero and each subsequent cumulative sum value adds the subsequent value from the destination buffer. As such, the values of the cumulative sums array, CUM_SUM, can be calculated using the formula:

CUM_SUM[$i$+1]=CUM_SUM[$i$]+DEST_BUF[$i$],
where CUM_SUM[0]=0.

Using the above formula, the cumulative sums array can include the following values:

CUM_SUM[0] = 0

CUM_SUM[1] = 0 + $B1$

CUM_SUM[2] = 0 + $B1$ + $B2$

CUM_SUM[3] = 0 + $B1$ + $B2$ + $B3$

-continued

CUM_SUM[4] = 0 + $B1$ + $B2$ + $B3$ + $B4$

...

CUM_SUM[9] = 0 + $B1$ + $B2$ + $B3$ + $B4$ + ... + $B9$

...

At 1508, the process 1500 determines a context index using the cumulative sums. The calculated context index can be used to determine the context. The context can be determined using a difference of two cumulative sums. Which two cumulative sums are used depends on the size of the template. In an case that the template size is tz_size=5, the context index of a value at index i of the current scan-order anti-diagonal line can be calculated using the formula:

Context index[$i$]=CUM_SUM[$tz$_size+2($i$−1)]−CUM_SUM[2($i$−1)]

For example, for a template of size 5, Context Index[1] can be given by CUM_SUM[5]−CUM_SUM[0]; Context Index[2] can be given by CUM_SUM[7]−CUM_SUM[2]; Context Index[3] can be given by CUM_SUM[9]−CUM_SUM[4]; and so on.

Figure 16:
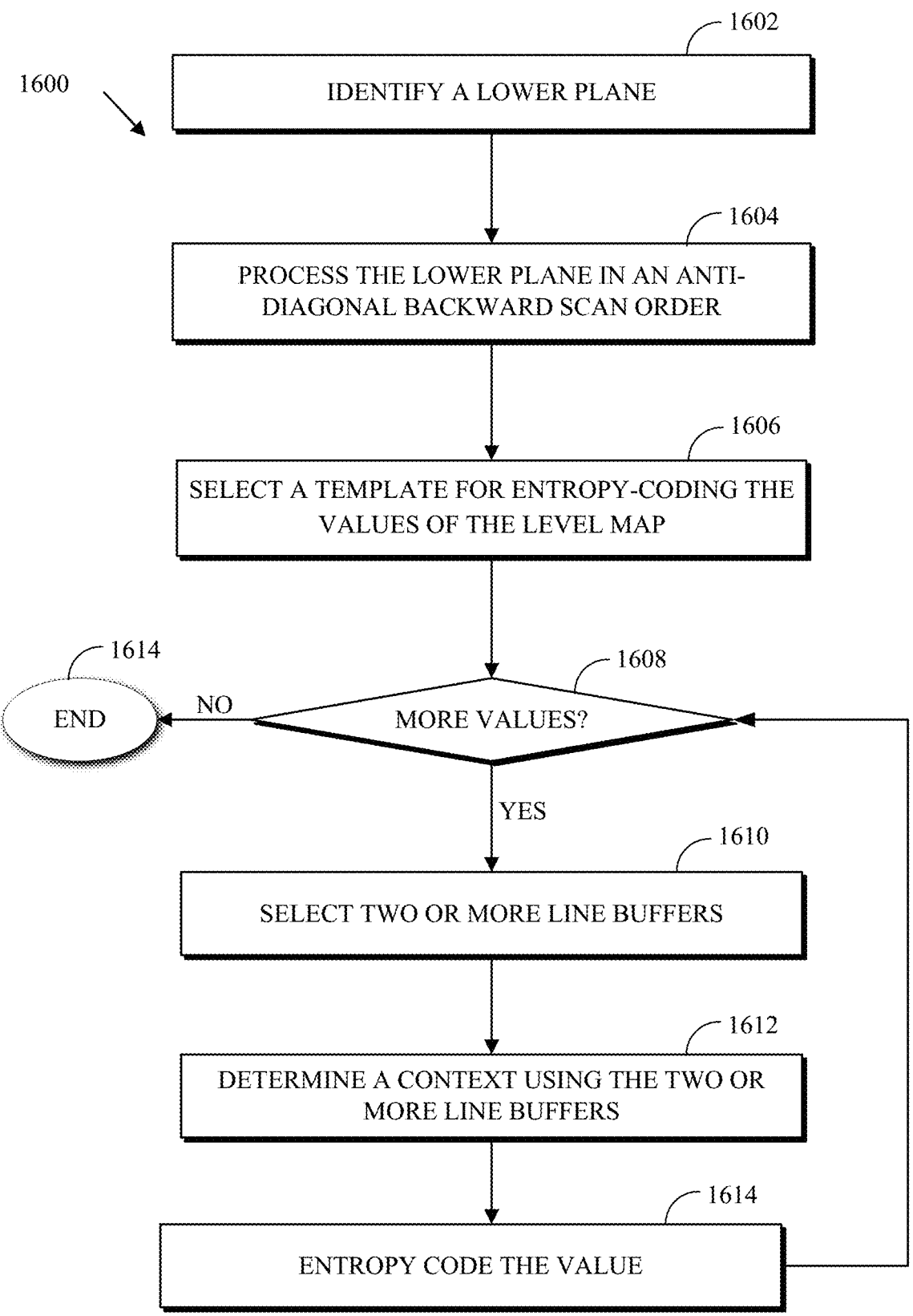
FIG. 16 is flowchart diagram of a process for coding a transform block of transform coefficients according to an implementation of this disclosure.

FIG. 16 is flowchart diagram of a process 1600 for coding a transform block of transform coefficients according to an implementation of this disclosure. The process 1600 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 1600. The process 1600 may be implemented in whole or in part in the entropy encoding stage 408 of the encoder 400 and/or the entropy decoding stage 502 of the decoder 500. The process 1600 can be implemented using specialized hardware or firmware. Multiple processors, memories, or both, may be used.

At 1602, the process 1600 identifies a lower plane. The lower plane can be as described above with respect to FIGS. 11-13. That is, values of the lower plane code an "up-to" value for some of the transform coefficients of the transform block. In an implementation, the lower plane includes values for transform coefficients up to the last non-zero coefficient of the transform block.

In the case of an encoder, create, form, produce, select, construct, determine, specify, generate, or other identify in any manner whatsoever. In the case of the encoder, the values of the lower plane are to be encoded in a encoded bitstream, such as the compressed bitstream 420 of FIG. 4. In the case of a decoder, identify can mean identify the transform block for which the lower plane values are to be decoded.

At 1604, the process 1600 processes the lower plane according to a scan order. The scan can be the anti-diagonally aligned scan order as described above. The scan order can be the scan order of the example 1300, as described with respect to FIG. 13.

At 1606, the process 1600 selects a template for entropy-coding the values of the lower plane. The template indicates, for a to-be-coded value of the lower plane, scan positions of already coded values of the lower plane. The scan positions are arranged, in the template, in at least two template anti-diagonal lines. For example, the template can be the template 1088, as described with respect to FIG. 12. Accordingly, the template anti-diagonal lines can be the template anti-diagonal lines 1202, 1204.

At 1608, the process 1600 determines whether there are more values of the lower plane to code. If so, the process proceeds to 1610; otherwise the process terminates at 1614.

At 1610, the process selects, based on the template anti-diagonal lines, two or more line buffers. As used in this disclosure, "select" means to create, form, produce, identify, construct, determine, specify, generate, or other select in any manner whatsoever. Each of the two or more line buffers corresponds to a respective scan-order anti-diagonal line. For example, as described with respect to FIG. 13, in coding values of the scan-order anti-diagonal line 13-6, a first line buffer LB1 corresponding to the scan-order anti-diagonal line 1310 is used and a second line buffer LB2 corresponding to the scan-order anti-diagonal line 1308 are selected.

At 1612, the process 1600 determines a context using the two or more line buffers. As described above with respect to FIGS. 10A-10B and FIG. 13, the process 1600 determines a context index using the neighboring values identified by the template. The context index is determined using a combination of the values. In an implementation, the combination is the sum of the values. Using the context index, a context is identified, retrieved, accessed, or the like for coding the current value.

At 1614, the process 1600 codes the value using the determined context. After 1614, the process 1600 proceeds back to 1608 to determine whether there are additional values to code.

The process 1600 can additionally include an operation for coding a higher plane including residual coefficients. A maximum level can be associated with the lower plane and each residual coefficient of the higher plane corresponding to a respective non-zero transform coefficient of the transform block having an absolute value exceeding the maximum level.

In an example of the process 1600, the template includes five scan positions arranged along two template anti-diagonal lines. For example, the template can be the template 1088 of FIG. 12. A first template anti-diagonal line (e.g., the template anti-diagonal line 1202) includes at least two of the five scan positions and a second template anti-diagonal (e.g., the template anti-diagonal line 1204) includes at least three scan positions. Each of the at least three scan positions are different from each of the at least two scan positions.

In an example of the process 1600, the template includes seven scan positions arranged along three template anti-diagonal lines. For example, the template can be the template 1070 of FIG. 10A. A first template anti-diagonal line includes at least two scan positions of the seven scan positions, a second template anti-diagonal line includes at least three scan positions of the seven scan positions, and a third template anti-diagonal line includes at least four scan positions of the seven scan positions. Each of the at least two scan positions, the at least three scan positions, and the at least four scan positions are different scan positions.

In yet another example, the process 1600 additionally includes maintaining, for coding values of a current scan-order anti-diagonal line, a first line buffer and a second line buffer. The first line buffer and the second line buffer can be as described with respect to FIG. 14. As such, the first line buffer can correspond to a first scan-order anti-diagonal line scanned, using the backward scan order, immediately before the current anti-diagonal line; and the second line buffer corresponds to a second scan-order anti-diagonal line scanned, using the backward scan order, immediately before the first anti-diagonal line. The process 1600 also includes, as described with respect to FIG. 14, replacing, for coding coefficients of an immediately subsequent scan-order anti-diagonal line to the current scan-order anti-diagonal line, the second line buffer with the first line buffer and replace the first line buffer with a line buffer corresponding to the current anti-diagonal line.

In yet another example, the process 1600 can include interleaving the first line buffer and the second line buffer in a destination buffer. The destination buffer can be used for determining the context for coding the current value. The destination buffer can be as described with respect to FIG. 15.

In an implementation of the process 1600, determining the context for coding the current value using the destination buffer can include calculating a respective cumulative sum for each location of the destination buffer, and determining the context using a difference between a first cumulative sum and a second cumulative sum. The first cumulative sum and the second cumulative sum can be selected based on a position of the current value.

For simplicity of explanation, the processes 600, 900, 1100, 1400, 1500, and 1600 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a transform block of transform coefficients, the apparatus comprising:
a processor configured to execute instructions to:
obtain a transform type of a transform used for decoding the transform block, the transform being used to perform an inverse transformation operation;
select, based on the transform type, a template for entropy-decoding values related to the transform coefficients,
the template indicating, for a current value of the values to be decoded, relative positions of already coded values with respect to the current value, the relative positions being one of Cartesian coordinates or scan positions in a scan order, and
the template used for determining a probability distribution for entropy decoding the current value;
determine, using the template, a context for selecting the probability distribution for entropy decoding the current value of the values; and
entropy decode, from a compressed bitstream, the current value using the probability distribution.

2. The apparatus of claim 1, wherein the template is further selected based on a location of the current value in the transform block.

3. The apparatus of claim 1, wherein the template comprises five scan positions.

4. The apparatus of claim 3, wherein the five scan positions are arranged along two template anti-diagonal lines, wherein a first of the two template anti-diagonal lines includes at least two of the five scan positions and a second of the two template anti-diagonal lines includes at least three scan positions, each of the at least three scan positions being different from each of the at least two of the five scan positions.

5. The apparatus of claim 1, wherein the transform type includes a 1-dimensional vertical transform type and the current value is at position (x, y) of the transform block, and wherein the template comprises positions (x+1, y), (x+2, y), (x+3, y), (x+4, y), (x, y+1), (x+1, y+1), and (x+1, y+2).

6. The apparatus of claim 1, wherein the transform type includes a 1-dimensional horizontal transform type and the current value is at position (x, y) of the transform block, and wherein the template comprises at positions (x+1, y), (x, y+1), (x+1, y+1), (x, y+2), (x+1, y+2), (x, y+3), and (x, y+4).

7. The apparatus of claim 1, wherein the transform type includes a 2-dimensional horizontal transform type and the current value is at position (x, y) of the transform block, and wherein the template comprises positions (x+1, y), (x+2, y), (x, y+1), (x+1, y+1), (x+2, y+1), (x, y+2), and (x+1, y+2).

8. The apparatus of claim 1, wherein the transform type includes a 2-dimensional horizontal transform type and the current value is at position (x, y) of the transform block, and wherein the template comprises positions (x+1, y), (x+2, y), (x+3, y), (x, y+1), (x+1, y+1), (x, y+2), (x+1, y+2), and (x, y+3).

9. The apparatus of claim 1, wherein the transform type includes a 2-dimensional horizontal transform type and the current value is at position (x, y) of the transform block, and wherein the template comprises positions (x+1, y), (x+2, y), (x+3, y), (x+4, y), and (x, y+1).

10. The apparatus of claim 1, wherein the transform type includes a 1-dimensional transform type and the current value is at position (x, y) of the transform block, and wherein the template comprises positions (x+1, y), (x+2, y), (x+3, y), (x, y+1), (x+1, y+1).

11. The apparatus of claim 1, wherein the values related to the transform coefficients comprise a level-k map where k>0, wherein the level-k map is a binary map that indicates which of the transform coefficients have absolute values greater than or equal to k.

12. The apparatus of claim 1, wherein the values related to the transform coefficients comprise a residual map, wherein the residual map comprises transform coefficient values in excess of a maximum level.

13. A method for decoding a transform block of transform coefficients, comprising:
obtaining a transform type of a transform used for decoding the transform block, the transform being used to perform an inverse transformation operation;

selecting, based on the transform type, a template for entropy-decoding values related to the transform coefficients, the template indicating, for a current value of the values to be decoded, relative positions of already coded values with respect to the current value, the relative positions being one of Cartesian coordinates or scan positions in a scan order, and the template used for determining a probability distribution for entropy decoding the current value;

determining, using the template, a context for selecting the probability distribution for entropy decoding the current value; and entropy decoding, from a compressed bitstream, the current value using the probability distribution.

14. The method of claim 13, wherein the template is further selected based on a location of the current value in the transform block.

15. The method of claim 13, wherein the template comprises five scan positions.

16. The method of claim 15, wherein the five scan positions are arranged along two template anti-diagonal lines, wherein a first of the two template anti-diagonal lines includes at least two of the five scan positions and a second of the two template anti-diagonal lines includes at least three scan positions, each of the at least three scan positions being different from each of the at least two of the five scan positions.

17. The method of claim 13, wherein a first template is selected in a case that the transform type includes a 1-dimensional vertical transform type, a second template is selected in a case that the transform type includes a 1-dimensional horizontal transform type, and a third template is selected in a case that the transform type includes a 2-dimensional transform type, and wherein the first template, the second template, and the third template are different templates.

18. A non-transitory computer readable medium storing instructions operable to cause one or more processors to perform operations for decoding a transform block of transform coefficients, the operations comprising:

obtaining a transform type of a transform used for decoding the transform block, the transform being used to perform an inverse transformation operation;

selecting, based on the transform type, a template for entropy-decoding values related to the transform coefficients, the template indicating, for a current value of the values to be decoded, relative positions of already coded values with respect to the current value, the relative positions being one of Cartesian coordinates or scan positions in a scan order, and the template used for determining a probability distribution for entropy decoding the current value;

determining, using the template, a context for selecting the probability distribution for entropy decoding the current value; and entropy decoding, from a compressed bitstream, the current value using the probability distribution.

19. The non-transitory computer readable medium of claim 18, wherein a first template is selected in a case that the transform type includes a 1-dimensional vertical transform type, a second template is selected in a case that the transform type includes a 1-dimensional horizontal transform type, and a third template is selected in a case that the transform type includes a 2-dimensional transform type, and wherein the first template, the second template, and the third template are different templates.

20. The non-transitory computer readable medium of claim 18, wherein the values related to the transform coefficients comprise a level-k map where k>0, wherein the level-k map is a binary map that indicates which of the transform coefficients have absolute values greater than or equal to k.

* * * * *